(12) United States Patent
Tachibana et al.

(10) Patent No.: US 11,862,212 B2
(45) Date of Patent: Jan. 2, 2024

(54) MAGNETIC RECORDING MEDIUM AND SERVO SIGNAL RECORDING DEVICE

(71) Applicant: Sony Group Corporation, Tokyo (JP)

(72) Inventors: Junichi Tachibana, Tokyo (JP); Noboru Sekiguchi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 248 days.

(21) Appl. No.: 17/599,843

(22) PCT Filed: Mar. 27, 2020

(86) PCT No.: PCT/JP2020/014055
§ 371 (c)(1),
(2) Date: Sep. 29, 2021

(87) PCT Pub. No.: WO2020/203785
PCT Pub. Date: Oct. 8, 2020

(65) Prior Publication Data
US 2022/0189506 A1 Jun. 16, 2022

(30) Foreign Application Priority Data
Mar. 29, 2019 (JP) .................. 2019-069206

(51) Int. Cl.
*G11B 5/592* (2006.01)
*G11B 5/706* (2006.01)
*G11B 5/78* (2006.01)

(52) U.S. Cl.
CPC ............ *G11B 5/5928* (2013.01); *G11B 5/706* (2013.01); *G11B 5/78* (2013.01)

(58) Field of Classification Search
None
See application file for complete search history.

(56) References Cited

U.S. PATENT DOCUMENTS 4,085,430 A * 4/1978 Gerkema ................ G11B 5/58
7,800,862 B1 * 9/2010 Dugas .................. G11B 5/3116
360/119.06

(Continued)

FOREIGN PATENT DOCUMENTS

JP 2009037700 A 2/2009
JP 2014199706 A 10/2014

(Continued)

OTHER PUBLICATIONS

International Search Report dated Jun. 16, 2020 in connection with PCT/JP2020/014055.

*Primary Examiner* — Fred Tzeng
(74) *Attorney, Agent, or Firm* — K&L Gates LLP

(57) ABSTRACT

[Solving Means] A magnetic recording medium according to an embodiment of the present technology is a tape-shaped magnetic recording medium, including: a magnetic layer including a servo band, a servo signal being recorded on the servo band. An index expressed by Sq×Fact.(p–p)/F0(p–p) is 0.42 or more, Sq being a squareness ratio of the magnetic layer in a perpendicular direction, F0(p–p) being a peak-to-peak value of a first magnetic force gradient strength observed by a magnetic force microscope when a servo signal is saturation-recorded on the magnetic layer, Fact.(p–p) being a peak-to-peak value of a second magnetic force gradient strength for the servo signal recorded on the servo band observed by the magnetic force microscope.

11 Claims, 17 Drawing Sheets

(56) References Cited

U.S. PATENT DOCUMENTS

| | | | | |
|---|---|---|---|---|
| 11,302,351 B2* | 4/2022 | Yamaga | ................ | G11B 5/733 |
| 2014/0268414 A1* | 9/2014 | Nakashio | ................ | G11B 5/70 |
| | | | | 360/110 |
| 2017/0355022 A1 | 12/2017 | Kaneko et al. | | |
| 2018/0350400 A1 | 12/2018 | Kaneko et al. | | |
| 2019/0295590 A1 | 9/2019 | Kaneko et al. | | |
| 2020/0402531 A1* | 12/2020 | Yamaga | ................ | G11B 5/733 |
| 2022/0148618 A1* | 5/2022 | Yamaga | ............. | G11B 5/00817 |

FOREIGN PATENT DOCUMENTS

| | | | |
|---|---|---|---|
| JP | 2017224365 A | 12/2017 | |
| JP | 2018005970 A | 1/2018 | |
| JP | 2018073454 A | 5/2018 | |

\* cited by examiner

MAGNETIC RECORDING MEDIUM AND SERVO SIGNAL RECORDING DEVICE

TECHNICAL FIELD

The present technology relates to a magnetic recording medium on which a servo signal has been recorded, and a servo signal recording device.

BACKGROUND ART

In recent years, a magnetic recording medium has been widely used for backing up electronic data, and the like. As one magnetic recording medium, a magnetic tape has been widely used.

The magnetic layer of the magnetic tape is provided with a data band including a plurality of recording tracks, and data is recorded on this recording track. In addition, in the magnetic layer, servo bands are provided at positions where a data band is sandwiched in the width direction, and a servo signal is recorded on this servo band. The magnetic head performs alignment with respect to the recording tracks by reading servo signals recorded on servo bands (see, for example, Patent Literature 1).

As a recording method to a magnetic recording medium, a horizontal magnetic recording method in which magnetic particles in the magnetic layer are magnetized in a horizontal direction to record data and a perpendicular magnetic recording method in which magnetic particles in the magnetic layer are magnetized in a perpendicular direction to record data are known. The perpendicular magnetic recording method can record data with high density as compared with the horizontal magnetic recording method.

CITATION LIST

Patent Literature

Patent Literature 1: Japanese Patent Application Laid-open No. 2014-199706

DISCLOSURE OF INVENTION

Technical Problem

It is expected that servo band widths will become narrower with the increase in the capacity of a magnetic tape in recent years. For example, in the magnetic tape of the LTO format, a servo pattern including two different azimuthal slopes is recorded as a servo signal. In this case, in order to cope with the increase in the capacity of a magnetic tape, it is necessary to increase the inclination angle of the above-mentioned azimuthal slope with respect to the tape width direction. As a result, since the azimuth loss with the servo reproduction head increases, the SNR (signal-to-noise ratio) of a servo reproduction signal, which is the reproduction output of the servo signal, is inevitably lowered. Moreover, in the perpendicular magnetic recording method, there is a problem that the SNR of a servo reproduction signal is likely to decrease affected by the demagnetizing field in the perpendicular direction of the magnetic layer.

In view of the circumstances as described above, it is an object of the present technology to provide a magnetic recording medium and a servo signal recording device that are capable of suppressing the degradation of a servo reproduction signal due to the increase in the capacity.

Solution to Problem

A magnetic recording medium according to an embodiment of the present technology is a tape-shaped magnetic recording medium including: a magnetic layer including a servo band, a servo signal being recorded on the servo band.

An index expressed by Sq×Fact.(p-p)/F0(p-p) is 0.42 or more, Sq being a squareness ratio of the magnetic layer in a perpendicular direction, F0(p-p) being a peak-to-peak value of a first magnetic force gradient strength observed by a magnetic force microscope when a servo signal is saturation-recorded on the magnetic layer, Fact.(p-p) being a peak-to-peak value of a second magnetic force gradient strength for the servo signal recorded on the servo band observed by the magnetic force microscope.

In the present technology, focusing on the above-mentioned index expressed by the product of the squareness ratio Sq and the ratio of the peak-to-peak value of the second magnetic force gradient strength to the peak-to-peak value of the first magnetic force gradient strength, a servo signal is reproduced with a relatively high SNR by setting the index to 0.42 or more. As a result, it is possible to suppress the degradation of the servo reproduction signal due to the increase in the capacity.

The index may be 0.5 or more.

The index may be 0.6 or more.

The squareness ratio (Sq) of the magnetic layer in the perpendicular direction may be 0.45 or more.

The squareness ratio (Sq) of the magnetic layer in the perpendicular direction may be 0.6 or more.

The ratio (Fact.(p-p)/F0(p-p)) of Fact.(p-p) to F0(p-p) may be 0.6 or more.

The ratio (Fact.(p-p)/F0(p-p)) of Fact.(p-p) to F0(p-p) may be 0.7 or more.

The ratio (Fact.(p-p)/F0(p-p)) of Fact.(p-p) to F0(p-p) may be 0.8 or more.

A residual magnetization (Mrt) of the magnetic layer may be 0.35 or more.

The residual magnetization (Mrt) of the magnetic layer may be 0.45 or more.

The servo signal may be a servo signal recording pattern including a plurality of stripes inclined at a predetermined azimuth angle with respect to a tape width direction.

The magnetic layer may contain a magnetic powder of hexagonal ferrite, ε-iron oxide, or cobalt ferrite.

A servo signal recording device according to an embodiment of the present technology is a device that records a servo signal on a tape-shaped magnetic recording medium including a magnetic layer including a servo band, the device including a servo write head and an auxiliary magnetic pole, including a servo write head; and an auxiliary magnetic pole.

The servo write head records a servo signal on the servo band.

The auxiliary magnetic pole portion is disposed to face the servo write head with the magnetic layer interposed therebetween, and is formed of a soft magnetic material.

Advantageous Effects of Invention

In accordance with the present technology, it is possible to suppress the degradation of the servo reproduction signal due to the increase in the capacity.

Note that the effect described here is not necessarily limitative, and any of the effects described in the present disclosure may be provided.

BRIEF DESCRIPTION OF DRAWINGS

FIG. 1 is a schematic diagram of a magnetic recording medium according to an embodiment of the present technology as viewed from the side.

FIG. 3 is an enlarged view showing recording tracks in a data band of the magnetic layer.

FIG. 5 is a schematic diagram showing a data recording device.

FIG. 6 is a diagram of a head unit in the data recording device as viewed from below.

MODE(S) FOR CARRYING OUT THE INVENTION

An embodiment according to the present technology will now be described below with reference to the drawings.

[Configuration of Magnetic Recording Medium]

Figure 1:
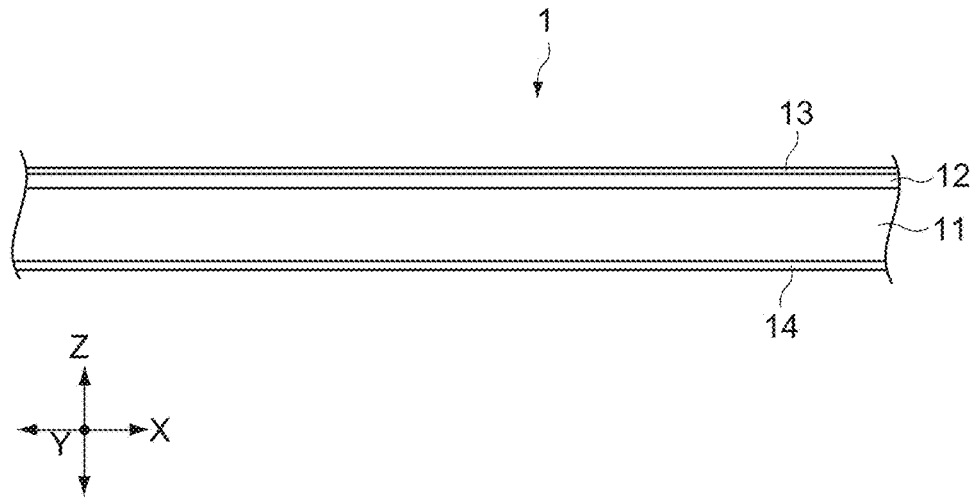
FIG. 1 is

First, a basic configuration of a magnetic recording medium will be described. FIG. 1 is a schematic diagram showing a magnetic recording medium 1 according to an embodiment of the present technology as viewed from the side, and FIG. 2 is a schematic diagram showing the magnetic recording medium 1 as viewed from the side of a magnetic layer.

Figure 2:
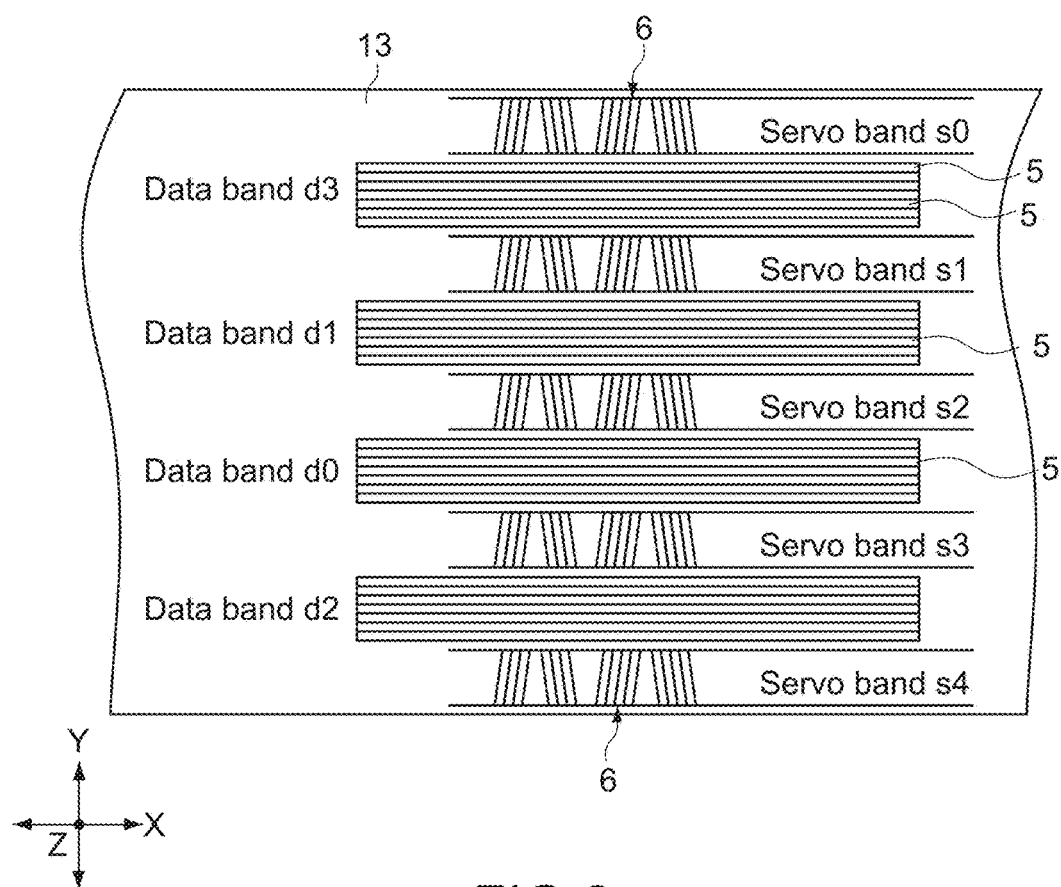
FIG. 2 is a schematic diagram showing the magnetic recording medium as viewed from the side of a magnetic layer.

As shown in FIG. 1 and FIG. 2, the magnetic recording medium 1 has a tape shape that is long in the longitudinal direction (X-axis direction), short in the width direction (Y-axis direction), and thin in the thickness direction (Z axis direction). Note that in the present specification (and the drawings), a coordinate system with reference to the magnetic recording medium 1 is represented by an XYZ coordinate system.

The magnetic recording medium 1 is favorably configured to be capable of recording signals at the shortest recording wavelengths of 96 nm or less, more favorably 75 nm or less, still more favorably 60 nm or less, and particularly favorably 50 nm or less. The magnetic recording medium 1 is favorably used in a data recording device including a ring-type head as a recording head.

Referring to FIG. 1, the magnetic recording medium 1 includes a tape-shaped base material 11 that is long in the longitudinal direction (X-axis direction), a non-magnetic layer 12 provided on one main surface of the base material 11, a magnetic layer 13 provided on the non-magnetic layer 12, and a back layer 14 provided on the other main surface of the base material 11. Note that the back layer 14 may be provided as necessary and the back layer 14 may be omitted.

As the magnetic layer 13, a coating type magnetic medium using a perpendicular recording method is typically used. Note that the magnetic recording medium 1 including the magnetic layer 13 will be described below in detail.

[Data Band and Servo Band]

FIG. 2 is a schematic diagram of the magnetic recording medium 1 as viewed from above.

Referring to FIG. 2, the magnetic layer 13 includes a plurality of data bands d (data bands d0 to d3) long in the longitudinal direction (X-axis direction) in which a data signal is written, and a plurality of servo bands s (servo bands s0 to s4) long in the longitudinal direction in which a servo signal is written). The servo bands s are located at positions where the respective data bands d are sandwiched in the width direction (Y-axis direction).

In the present technology, the ratio of the area of the servo bands s to the area of the entire surface of the magnetic layer 13 is typically set to 4.0% or less. Note that the width of the servo band s is typically set to 95 μm or less. The ratio of the area of the servo bands s to the area of the entire surface of the magnetic layer 13 can be measured by, for example, developing the magnetic recording medium 1 using a developer such as a ferricolloid developer and then observing the developed magnetic recording medium 1 under an optical microscope.

Since the servo bands s are located at positions where the respective data bands d are sandwiched, the number of servo bands s is one more than the number of data bands d. In the example shown in FIG. 2, an example in which the number of data bands d is four and the number of servo bands s is five is shown (In existing systems, it is common to employ this approach).

Note that the number of data bands d and the number of servo bands s can be changed as appropriate, and these numbers may be increased.

In this case, the number of servo bands s is favorably five or more. When the number of servo bands s is five or more, it is possible to ensure stable recording/reproduction characteristics with less off-track by suppressing the effect of dimensional changes of the magnetic recording medium 1 in the width direction on the accuracy of servo signal reading, Further, the number of data bands d may be 8, 12, . . . , (i.e., 4n (n represents an integer greater than or equal to two)) and the number of servo bands s may be 9, 13, . . . (i.e., 4n+1 (n represents an integer greater than or equal to two)). In this case, it is possible to cope with the change of the number of data bands d and the number of servo bands s without changing the existing systems.

The data band d includes a plurality of recording tracks 5 that is long in the longitudinal direction and aligned in the width direction. The data signals are recorded on the recording tracks 5 along the recording tracks 5. Note that in the present technology, the one-bit length in the longitudinal direction in the data signal to be recorded on the data band d is typically 48 nm or less. The servo band s includes a servo signal recording pattern 6 of predetermined patterns on which a servo signal is recorded by a servo signal recording device (not shown).

Figure 3:
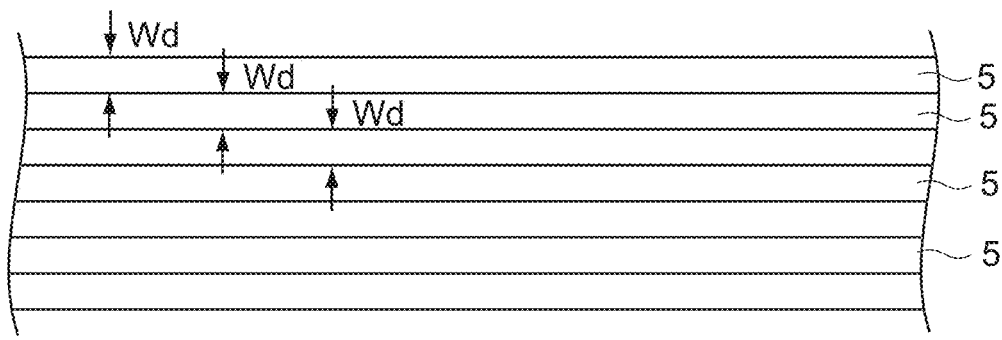
FIG. 3 is

FIG. 3 is an enlarged view showing the recording tracks 5 in the data band d. As shown in FIG. 3, the recording tracks 5 are each long in the longitudinal direction, are aligned in the width direction, and each have a predetermined recording track width Wd for each track in the width direction. This recording track width Wd is typically 2.0 μm or less. Note that such a recording track width Wd can be measured by, for example, developing the magnetic recording medium 1 using a developer such as a ferricolloid developer and then observing the developed magnetic recording medium 1 under an optical microscope.

The number of recording tracks 5 included in one data band d is, for example, approximately 1,000 to 2,000.

Figure 4:
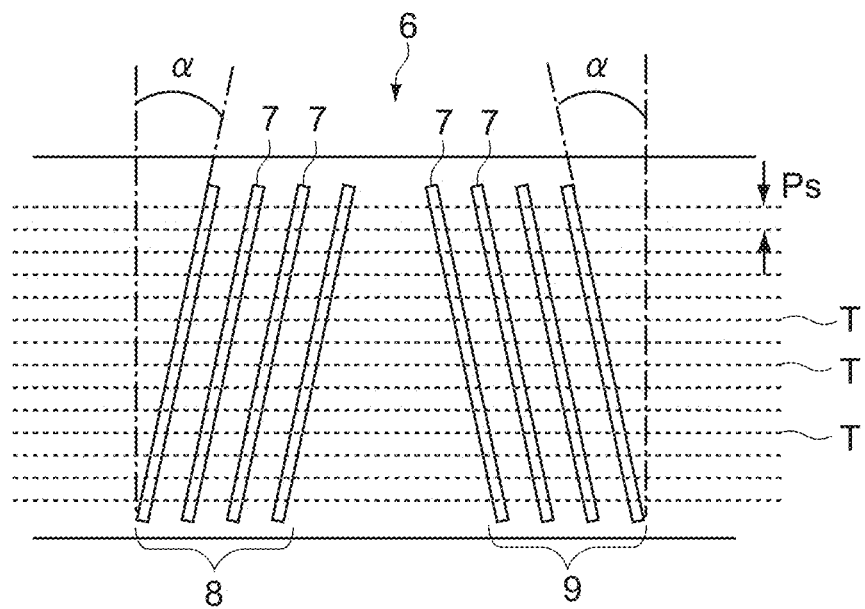
FIG. 4 is an enlarged view showing a servo signal recording pattern in a servo band of the magnetic layer.

FIG. 4 is an enlarged view showing the servo signal recording pattern 6 in the servo band s. As shown in FIG. 4, the servo signal recording pattern 6 includes a plurality of stripes 7 (azimuthal slope) inclined at a predetermined azimuth angle α with respect to the width direction (Y-axis direction). The azimuth angle is not particularly limited, is appropriately determined depending on the size and the like of the servo band s, and is, for example, 12°. Alternatively, the azimuth angle may be 15°, 18°, 21°, 24°, or the like.

The plurality of stripes 7 is classified into a first stripe group 8 that is inclined clockwise with respect to the width direction (Y-axis direction) and a second stripe group 9 which is inclined counterclockwise with respect to the width direction. Note that the shape and the like of such a stripe 7 can be measured by, for example, developing the magnetic recording medium 1 using a developer such as a ferricolloid developer and then observing the developed magnetic recording medium 1 under an optical microscope.

In FIG. 4, a servo trace line T, which is a line traced by the servo read head on the servo signal recording pattern 6, is indicated by a broken line. The servo trace line T is set along the longitudinal direction (X-axis direction) and is set at a predetermined interval Ps in the width direction.

The number of the servo trace lines T per servo band s is, for example, approximately 30 to 200.

The interval Ps between two adjacent servo trace lines T is the same as the value of the recording track width Wd, and is, for example, 2.0 μm or less, or 1.5 μm or less. Here, the interval Ps of the two adjacent servo trace lines T is a value that determines the recording track width Wd. That is, when the interval Ps between the servo trace lines T is narrowed, the recording track width Wd becomes smaller, and the number of recording tracks 5 included in one data band d increases. As a result, the recording capacity of data increases (the opposite is true in the case where the interval Ps increases). Therefore, in order to increase the recording capacity, while the recording track width Wd needs to be reduced, the interval Ps of the servo trace line T, is also narrowed. As a result, it is difficult to accurately trace adjacent servo trace lines. In this regard, in this embodiment, it is possible to cope with the narrowing of the interval Ps by increasing the reading accuracy of the servo signal recording pattern 6 as will be described below.

[Data Recording Device]

Figure 5:
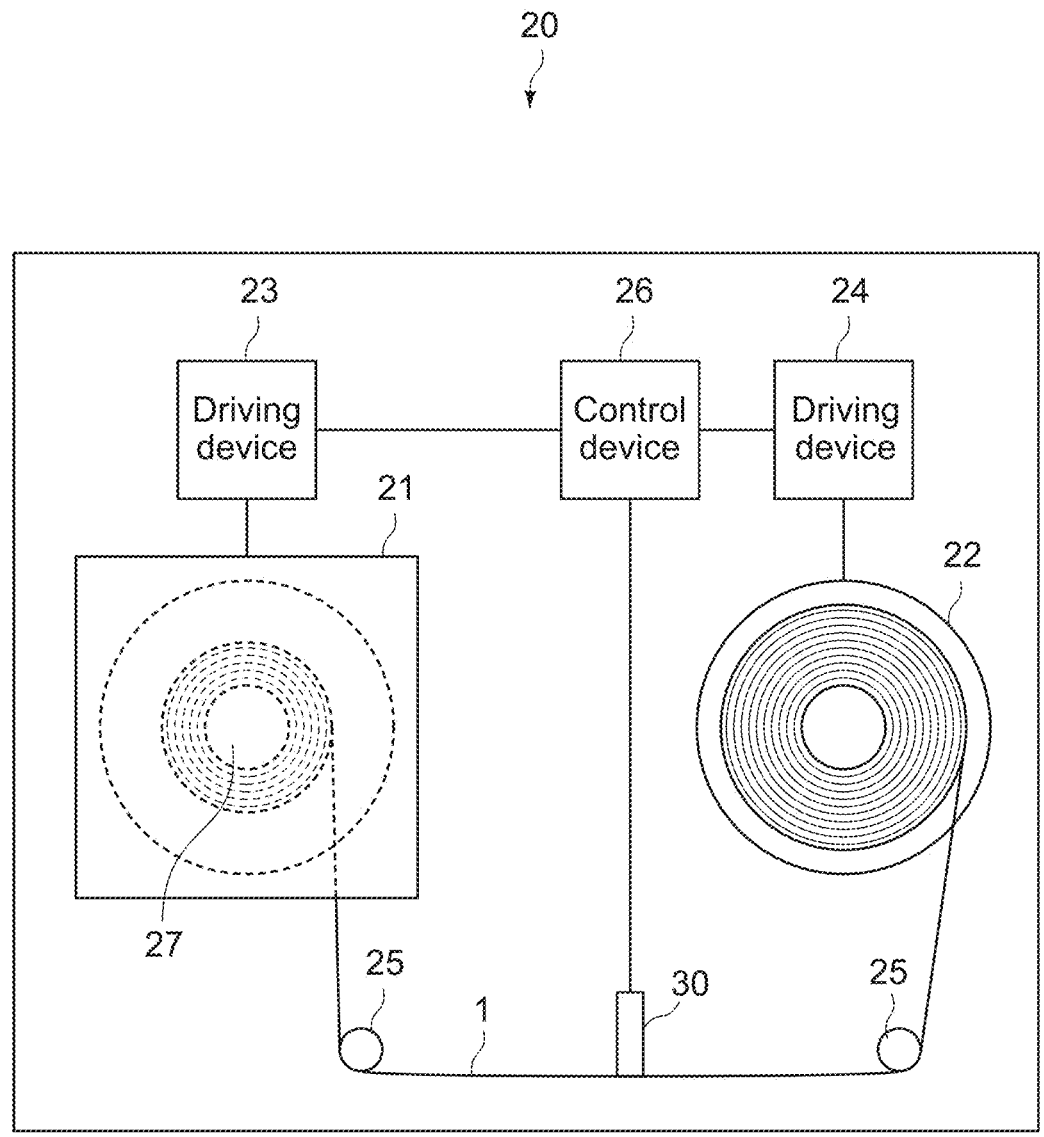
FIG. 5 is

Next, a data recording device 20 for recording/reproducing data signals to/from the magnetic recording medium 1 will be described. FIG. 5 is a schematic diagram showing the data recording device 20. Note that in the present specification (and the drawings), a coordinate system with reference to the data recording device 20 is represented by an X'Y'Z' coordinate system.

The data recording device 20 is configured to be capable of loading the cartridge 21 housing the magnetic recording medium 1. Note that although a case where the data recording device 20 is capable of loading one cartridge 21 will be described here for ease of description, the data recording device 20 may be configured to be capable of loading a plurality of cartridges 21. Further, the configuration of the cartridge 21 will be described below in detail.

As shown in FIG. 5, the data recording device 20 includes a spindle 27, a reel 22, a spindle driving device 23, a reel driving device 24, a plurality of guide rollers 25, a head unit 30, and a control device 26.

The spindle 27 is configured to be capable of loading the cartridge 21. The cartridge 21 complies with the LTO (Linear Tape Open) standard and rotatably houses the wound magnetic recording medium 1 inside the case. The reel 22 is configured to be capable of fixing the leading end of the magnetic recording medium 1 pulled out from the cartridge 21.

The spindle driving device 23 causes, in response to a command from the control device 26, the spindle 27 to rotate. The reel driving device 24 causes, in response to a command from the control device 26, the reel 22 to rotate. When data signals are recorded/reproduced on/from the magnetic recording medium 1, the spindle driving device 23 and the reel driving device 24 respectively cause the spindle 27 and the reel 22 to rotate, thereby causing the magnetic recording medium 1 to travel. The guide roller 25 is a roller for guiding the traveling of the magnetic recording medium 1.

The control device 26 includes, for example, a control unit, a storage unit, a communication unit, and the like. The control unit includes, for example, a CPU (Central Processing Unit) and the like, and integrally controls the respective units of the data recording device 20 in accordance with a program stored in the storage unit.

The storage unit includes a non-volatile memory on which various types of data and various programs are to be recorded, and a volatile memory used as a work area of the control unit. The above-mentioned various programs may be read from a portable recording medium such as an optical disk and a semiconductor memory, or may be downloaded from a server device on a network. The communication unit is configured to be capable of communicating with other devices such as a PC (Personal Computer), and a server device.

The head unit 30 is configure to be capable of recording, in response to a command from the control device 26, a data signal to the magnetic recording medium 1. Further, the head unit 30 is configured to be capable of reproducing data written to the magnetic recording medium 1 in response to a command from the control device 26.

Figure 6:
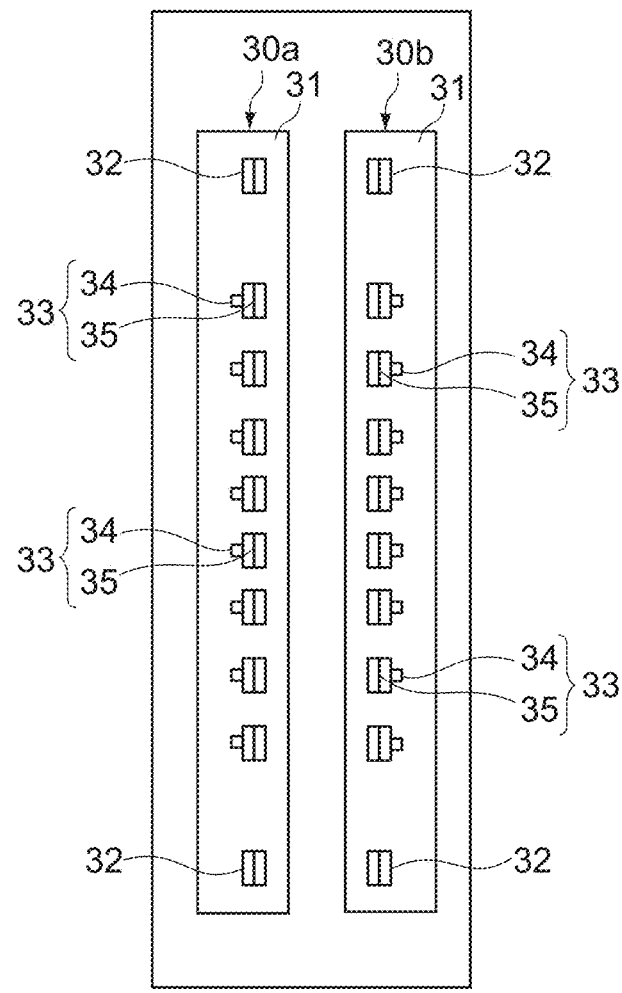
FIG. 6 is
Figure 6:
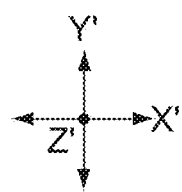

FIG. 6 is a diagram of the head unit 30 as viewed from below. As shown in FIG. 6, the head unit 30 includes a first head unit 30a and a second the head unit 30b. The first head unit 30a and the second head unit 30b are configured symmetrically in the X'-axis direction (the traveling direction of the magnetic recording medium 1). The first head unit 30*a* and the second head unit 30*b* are configured to be movable in the width direction (Y'-axis direction).

The first head unit 30*a* is a head used when the magnetic recording medium 1 travels in the forward direction (flow direction from the cartridge 21 side to the device 20 side). Meanwhile, the second head unit 30*b* is a head used when the magnetic recording medium 1 travels in the opposite direction (flow direction from the device 20 side to the cartridge 21 side).

Since the first head unit 30*a* and the second head unit 30*b* have basically the same configuration, the first head unit 30*a* will be typically described.

The first head unit 30*a* includes a unit body 31, two servo read heads 32, and a plurality of the data write/read heads 33.

A servo read head 32 is configured to be capable of reproducing a servo signal by reading the magnetic flux generated from magnetic information recorded on the magnetic recording medium 1 (servo band s) by an MR device (MR: Magneto Resistive) or the like. That is, the servo read head 32 reads the servo signal recording pattern 6 recorded on the servo band s to reproduce the servo signal. The servo read head 32 is provided one each on both ends of the width direction (Y'-axis direction) in the unit body 31. The interval between the two servo read heads 32 in the width direction (Y'-axis direction) is substantially the same as the distance between adjacent servo bands s in the magnetic recording medium 1.

The data write/read heads 33 are disposed along the width direction (Y'-axis direction) at equal intervals. Further, the data write/read head 33 is disposed at a position sandwiched between the two servo read heads 32. The number of the data write/read heads 33 is, for example, approximately 20 to 40, but this number is not particularly limited.

The data write/read head 33 includes a data write head 34 and a data read head 35. The data write head 34 is configured to be capable of recording data signals on the magnetic recording medium 1 by a magnetic field generated from a magnetic gap. Further, the data read head 35 is configured to be capable of reproducing a data signal by reading the magnetic field generated from the magnetic information recorded on the magnetic recording medium 1 (data band d) by an MR device (MR: Magneto Resistive) or the like.

In the first head unit 30*a*, the data write head 34 is disposed on the left side of the data read head 35 (upstream side when the magnetic recording medium 1 flows in the forward direction). Meanwhile, in the second head unit 30*b*, the data write head 34 is disposed on the right side of the data read head 35 (upstream side when the magnetic recording medium 1 flows in the opposite direction). Note that the data read head 35 is capable of reproducing a data signal immediately after the data write head 34 writes the data signal to the magnetic recording medium 1.

Figure 7:
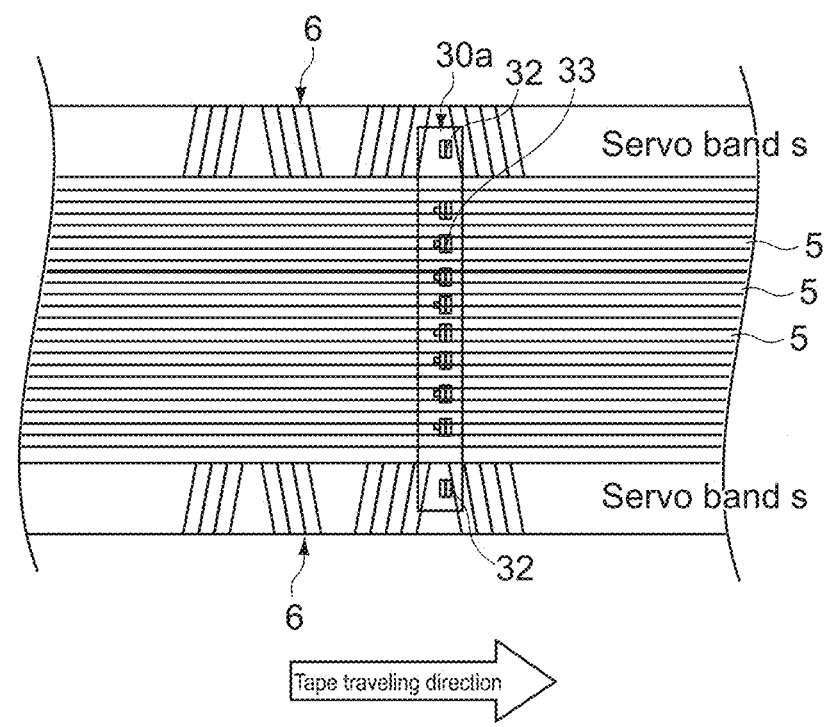
FIG. 7 is a diagram showing the state where a data signal is recorded/reproduced in the head unit.

FIG. 7 is a diagram showing the state when the first head unit 30*a* performs recording/reproduction of a data signal. Note that in the example shown in FIG. 7, a state where the magnetic recording medium 1 is caused to travel in the forward direction (flow direction from the cartridge 21 side to the device 20 side) is shown.

As shown in FIG. 7, when the first head unit 30*a* records/reproduces a data signal, one of the two servo read heads 32 is located on one of the two adjacent servo bands s and reads the servo signal on this servo band s.

Further, the other of the two servo read heads 32 of is located on the other of the two adjacent servo bands s and reads the servo signal on this servo band s.

Further, at this time, the control device 26 determines, on the basis of the reproduced waveform of the servo signal recording pattern 6, whether or not the servo read head 32 traces on the target servo trace line T (see FIG. 4) accurately.

This principle will be described. As shown in FIG. 4, the first stripe group 8 and the second stripe group 9 in the servo signal recording pattern 6 are inclined in opposite directions with respect to the width direction (Y-axis direction). For this reason, in the upper servo trace line T, the distances between the first stripe group 8 and the second stripe group 9 in the longitudinal direction (X-axis direction) are relatively small. Meanwhile, on the lower servo trace line T, the distances between the first stripe group 8 and the second stripe group 9 in the longitudinal direction (X-axis direction) are relatively wide.

Therefore, by obtaining the difference between the time at which the reproduced waveform of the first stripe group 8 has been detected and the time at which the reproduced waveform of the second stripe group 9 has been detected, the current position of the servo read head 32 in the width direction (Y-axis direction) relative to the magnetic recording medium 1 can be known.

Accordingly, the control device 26 is capable of determining, on the basis of the reproduced waveform of the servo signal, whether or not the servo read head 32 accurately traces on the target servo trace line T. Then, in the case where the servo read head 32 does not trace on the target servo trace line T accurately, the control device 26 causes the head unit 30 to move in the width direction (Y'-axis direction) to adjust the position of the head unit 30.

Referring to FIG. 7 again, the data write/read head 33 records data signals on the recording tracks 5 along the recording tracks 5 while the position of the data write/read head 33 in the width direction is adjusted (when shifted).

Here, when the magnetic recording medium 1 is completely pulled out of the cartridge 21, then, the magnetic recording medium 1 is caused to travel in the opposite direction (flow direction from the device 20 side to the cartridge 21 side). At this time, the second head unit 30*b* is used as the head unit 30.

Further, at this time, as the servo trace line T, the servo trace line T adjacent to the previously used servo trace line T is used. In this case, the head unit 30 is caused to move in the width direction (Y'-axis direction) by an amount corresponding to the interval Ps of the servo trace line T (=an amount corresponding to the recording track width Wd).

Further, in this case, the data signal is recorded on the recording track 5 adjacent to the recording track 5 on which the data signal has been previously recorded.

In this way, data signals are recorded on the recording track 5 while the magnetic recording medium 1 is reciprocated many times with the traveling direction thereof being changed between the forward direction and the reverse direction.

Here, for example, assumption is made that the number of servo trace lines T is 50 and the number of data write/read heads 33 included in the first head unit 30*a* (or the second head unit 30*b*) is 32. In this case, the number of recording tracks 5 included in one data band d is 50×32, i.e., 1,600. Thus, in order to record data signals in all of the recording tracks 5, the magnetic recording medium 1 needs to be reciprocated 25 times.

Figure 8:
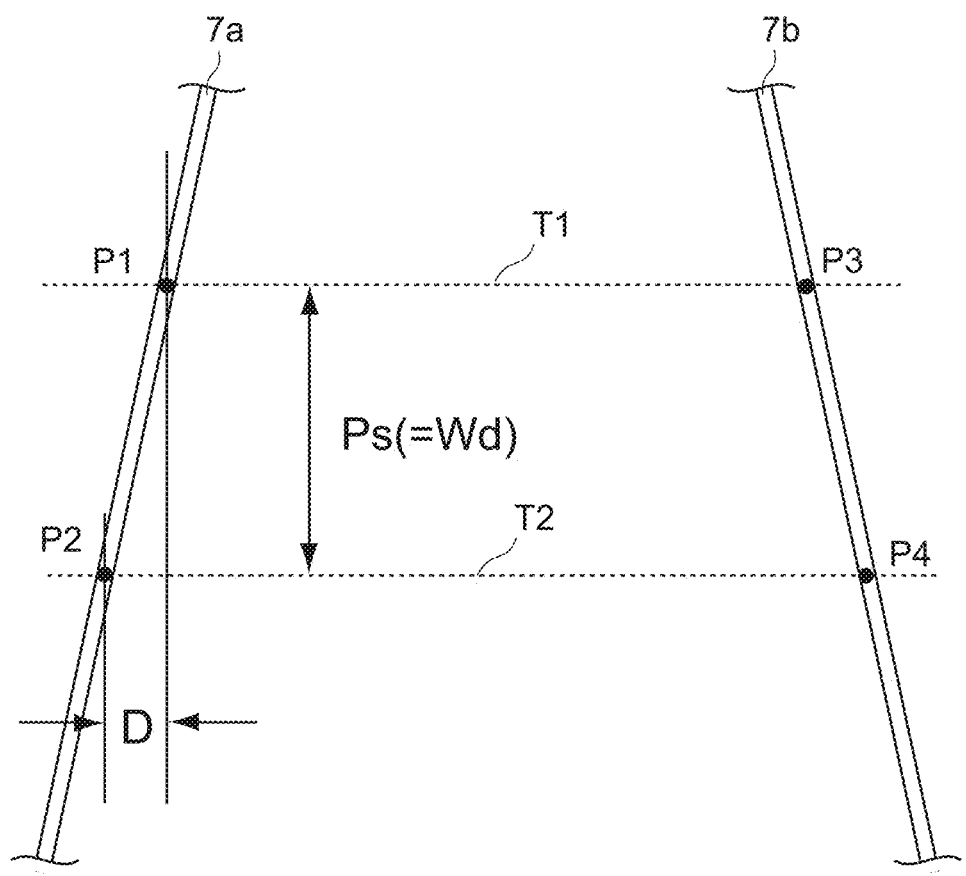
FIG. 8 is a diagram showing two stripes in the servo signal recording pattern.
Figure 8:
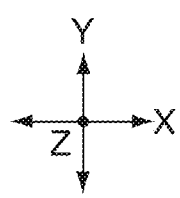

FIG. 8 is a diagram showing two stripes 7 in the servo signal recording pattern 6.

Referring to FIG. 8, an arbitrary stripe 7 of the plurality of stripes 7 included in the first stripe group 8 of the servo signal recording pattern 6 is defined as the first stripe 7*a*.

Further, an arbitrary stripe 7 of the plurality of stripes 7 included in the second stripe group 9 of the servo signal recording pattern 6 is defined as the second stripe 7b.

An arbitrary servo trace line T of the plurality of servo trace lines T is defined as the first servo trace line T1. Further, the servo trace line T adjacent to the first servo trace line T1 is defined as a second servo trace line T2.

The intersection of the first stripe 7a and the first servo trace line T1 is defined as P1. Note that regarding this point P1, an arbitrary point on the first stripe 7a may be used as the point P1.

The intersection of the first stripe 7a and the second servo trace line T2 is defined as P2. Note that regarding this point P2, a point on the first stripe 7a located at a position apart from the P1 by the interval Ps (i.e., by the amount corresponding to the recording track width Wd) in the width direction (Y-axis direction) may be used as the point P2.

The distance between the points P1 and P2 in the longitudinal direction (X-axis) is defined as a distance D. The distance D corresponds to the deviation in the longitudinal direction from the adjacent track.

The intersection between the second stripe 7b and the first servo trace line T1 is defined as P3, and the intersection between the second stripe 7b and the second servo trace line T2 is defined as P4.

When the first servo trace line T1 is traced, the difference between the time at which the reproduced waveform has been detected at the point P1 and the time at which the reproduced waveform has been detected at the point P3 needs to be determined. This difference is defined as a first period.

Similarly, when the second trace line T is traced, the difference between the time at which the reproduced waveform has been detected at the point P2 and the time at which the reproduced waveform has been detected at the point P4 needs to be determined. This difference is defined as the second period.

Next, a difference between the first period and the second period will be considered. Here, assumption is made that the interval Ps between the servo trace lines T and the recording track width Wd are 1.56 µm and the azimuth angle α is 12 degrees. In this case, the distance D is 1.56×tan 12°, i.e., 0.33 µm. The difference between the distance between the points P1 and P3 and the distance between the points P2 and P4 is 0.66 µm, because the difference is twice the distance D. At this time, assuming that the traveling velocity of the magnetic recording medium 1 is 5 m/s, 0.66/5000000=0.13 s is achieved. This is the difference between the first period and the second period.

However, in the case where the reproduction output of the servo signal is insufficient, such a minute difference cannot be accurately determined. In particular, in the case where the recording track width Wd is reduced and the interval Ps between the servo trace lines T is reduced in order to increase the number of recording tracks 5, the distance D is further narrowed and the difference between the first period and the second period is further reduced.

Further, it is expected that the servo band width will become narrower as the capacity of the magnetic tape increases in recent years. In this case, in order to cope with the increase in the capacity of the magnetic tape, it is necessary to increase the inclination angle of the azimuthal slope with respect to the tape width direction. As a result, since the azimuth loss with the servo read head increases, the SNR (signal-to-noise ratio) of a servo reproduction signal, which is the reproduction output of a servo signal, is inevitably lowered. Moreover, in the perpendicular magnetic recording method, there is a problem that the SNR of the servo reproduction signal is likely to decrease affected by the demagnetizing field in the perpendicular direction of the magnetic layer.

[Servo Signal Recording Device]

Figure 9:
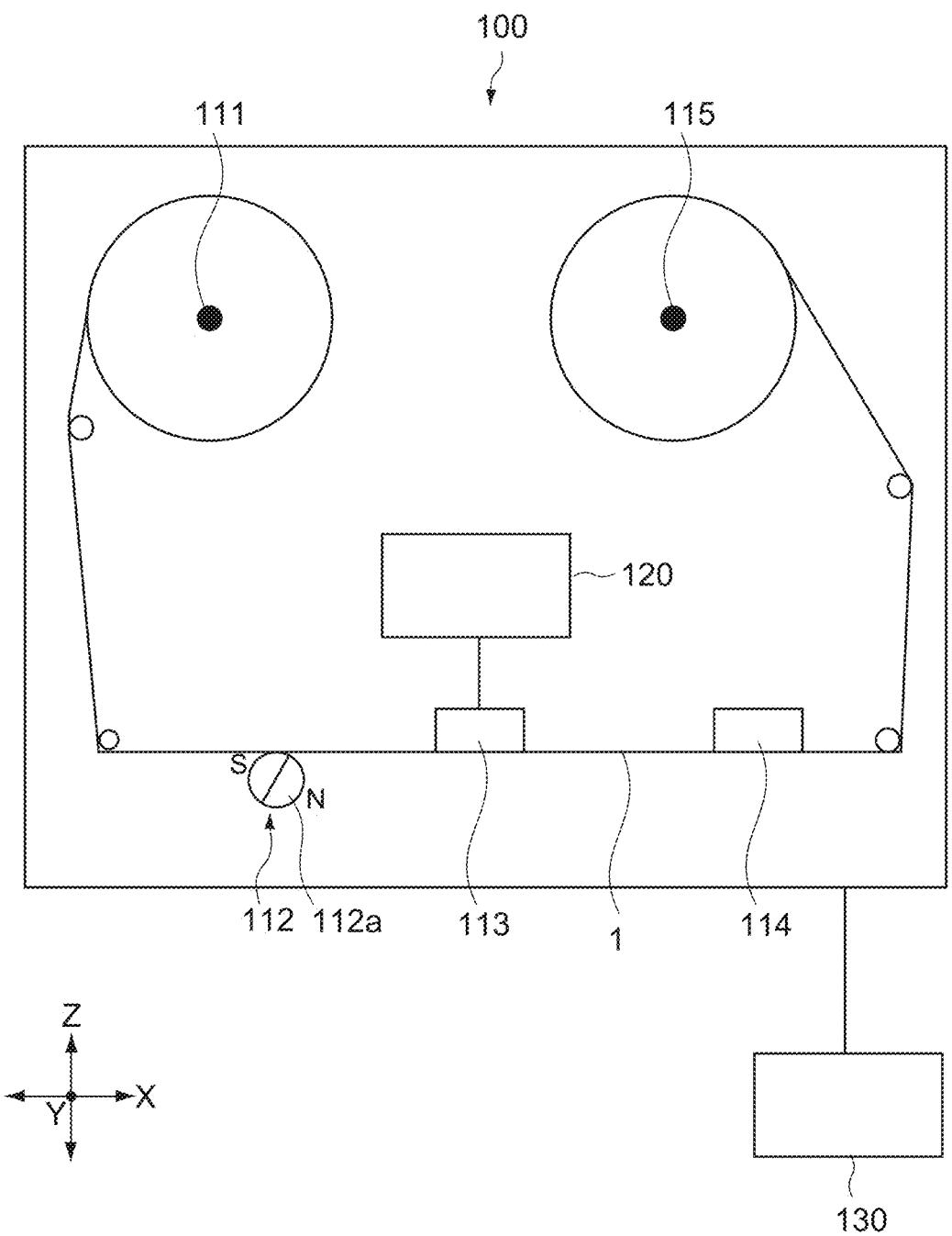
FIG. 9 is a schematic diagram showing an example of a servo signal recording device.

Next, a servo signal recording device will be described. FIG. 9 is a front view showing a typical servo signal recording device 100, and FIG. 10 is a partial enlarged view showing a part thereof.

Figure 10:
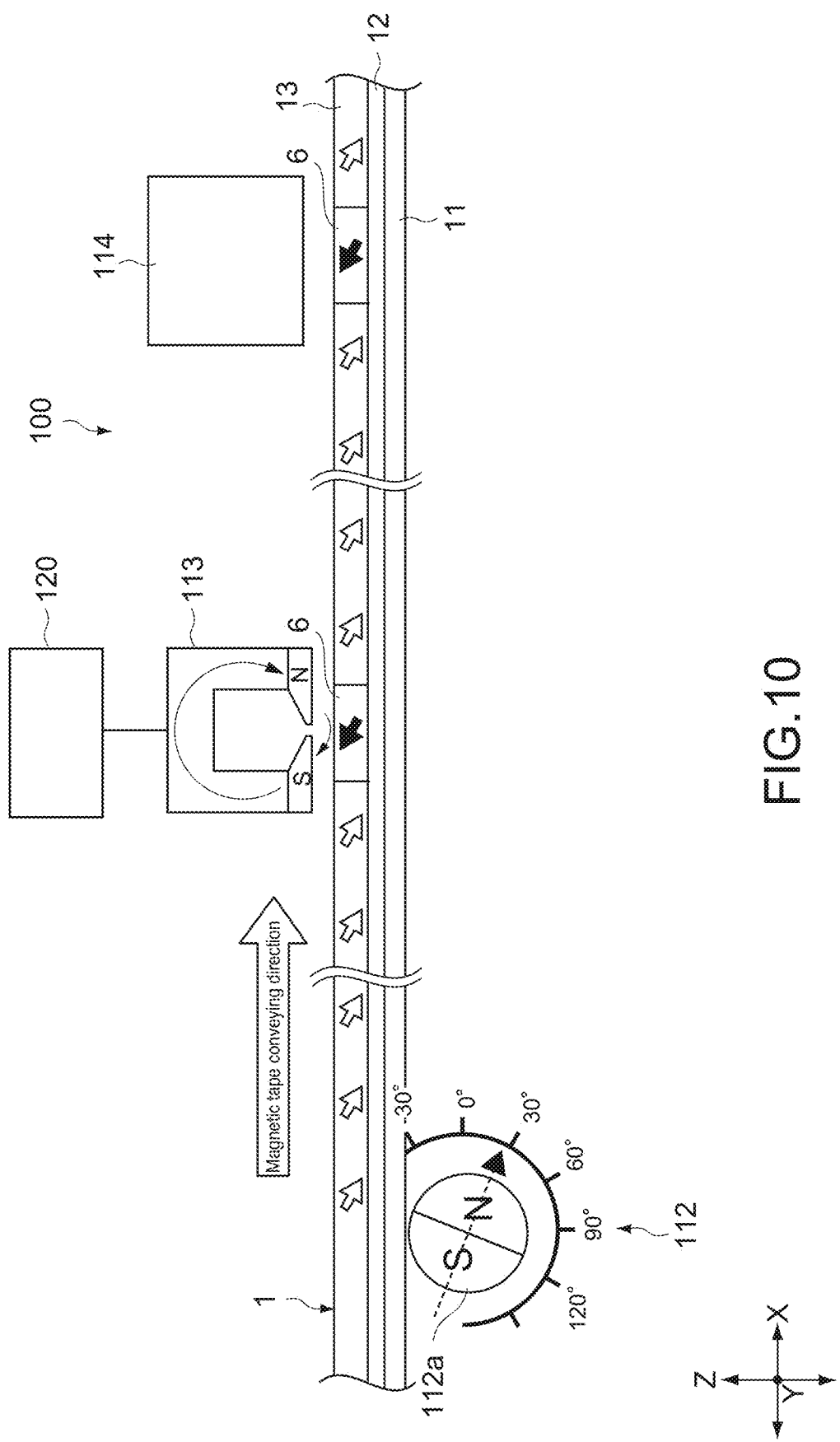
FIG. 10 is an enlarged view schematically showing a part of the servo signal recording device.

Referring to FIG. 9 and FIG. 10, the servo signal recording device 100 includes a feeding roller 111, a pre-processing unit 112, a servo write head 113, a reproduction head unit 114, and a take-up roller 115 in the order from the upstream side in the conveying direction of the magnetic recording medium 1. Further, the servo signal recording device 100 includes a drive unit 120 that drives the servo write head 113 and a controller 130 that integrally controls the servo signal recording device 100. The controller 30 includes a control unit that integrally controls the respective units of the servo pattern recording device 100, a recording unit that stores various programs/data needed for processing of the control unit, a display unit that displays data, an input unit for inputting data, and the like.

The feeding roller 111 is capable of rotatably supporting a roll-shaped magnetic recording medium 1 prior to recording of a servo signal. The feeding roller 111 is caused to rotate in accordance with the driving of a drive source such as a motor, and feeds the magnetic recording medium 1 toward the downstream side in accordance with the rotation.

The take-up roller 115 is caused to rotate in synchronism with the feeding roller 111 in accordance with the driving of a drive source such as a motor, and winds up the magnetic recording medium 1 on which a servo signal has been recorded in accordance with the rotation. The feeding roller 111 and the take-up roller 115 are capable of causing the magnetic recording medium 1 to move in the conveying path at a constant velocity.

The servo write head 113 is disposed on, for example, the upper side (the side of the magnetic layer 13) of the magnetic recording medium 1. Note that the servo write head 113 may be disposed on the lower side (the side of the base material 11) of the magnetic recording medium 1. The servo write head 113 generates a magnetic field at a predetermined timing in response to a pulse signal of a rectangular wave, and applies a magnetic field to a part of the magnetic layer 13 (after pre-processing) of the magnetic recording medium 1.

In this way, the servo write head 113 magnetizes a part of the magnetic layer 13 in a first direction to record a servo signal (hereinafter, referred to also as the servo signal recording pattern 6) on the magnetic layer 13 (see black arrows in FIG. 10 for the magnetization direction). The servo write head 113 is capable of recording the servo signal recording pattern 6 for each of the five servo bands s0 to s4 when the magnetic layer 13 passes underneath the servo write head 113, The first direction, which is the magnetization direction of the servo signal recording pattern 6, contains components in the perpendicular direction perpendicular to the upper surface of the magnetic layer 13. That is, in this embodiment, since a perpendicularly oriented magnetic powder is contained in the magnetic layer 13, the servo signal recording pattern 6 recorded on the magnetic layer 13 contains magnetization components in the perpendicular direction.

The pre-processing unit 112 is disposed on, for example, the lower side (the side of the base material 11) of the magnetic recording medium 1, on the upstream side of the servo write head 113. The pre-processing unit 112 may be disposed on the upper side (the side of the magnetic layer 13) of the magnetic recording medium 1. The pre-processing unit 112 includes a permanent magnet 112a that is rotatable about a Y-axis direction (the width direction of the magnetic recording medium 1) as a center axis of rotation. The shape of the permanent magnet 12a is, for example, a cylindrical shape or a polygonal prism shape, but is not limited thereto.

The permanent magnet 12a demagnetizes the entire magnetic layer 4 by applying a magnetic field to the entire magnetic layer 4 by means of a DC magnetic field prior to the servo pattern 6 being recorded by the servo write head 13. Thus, the permanent magnet 112a is capable of magnetizing the magnetic layer 4 in a second direction opposite to the magnetization direction of the servo pattern 6 in advance (see white arrows in FIG. 10). By making the two magnetization directions in opposite directions in this way, the reproduced waveform of the servo signal obtained by reading the servo signal recording pattern 6 can be made symmetrical in the up-and-down direction (±).

The reproduction head unit 114 is disposed on the upper side (the side of the magnetic layer 13) of the magnetic recording medium 1, on the downstream side of the servo write head 113. The reproduction head unit 114 reads the servo signal recording pattern 6 from the magnetic layer 13 of the magnetic recording medium 1, which has been pre-processed by the pre-processing unit 112, the servo signal recording pattern 6 having been recorded on the magnetic layer 13 by the servo write head 113. Typically, the reproduction head unit 114 detects the magnetic flux generated from the surface of the servo band s when the magnetic layer 13 passes underneath the reproduction head unit 114. The magnetic flux detected at this time becomes a reproduced waveform of the servo signal.

Note that also in the servo read head 32 in the head unit 30 of the above-mentioned data recording device 20, the servo signal recorded on the magnetic recording medium 1 is reproduced in the same principal.

[Reproduction Output of Servo Signal]

Figure 11:
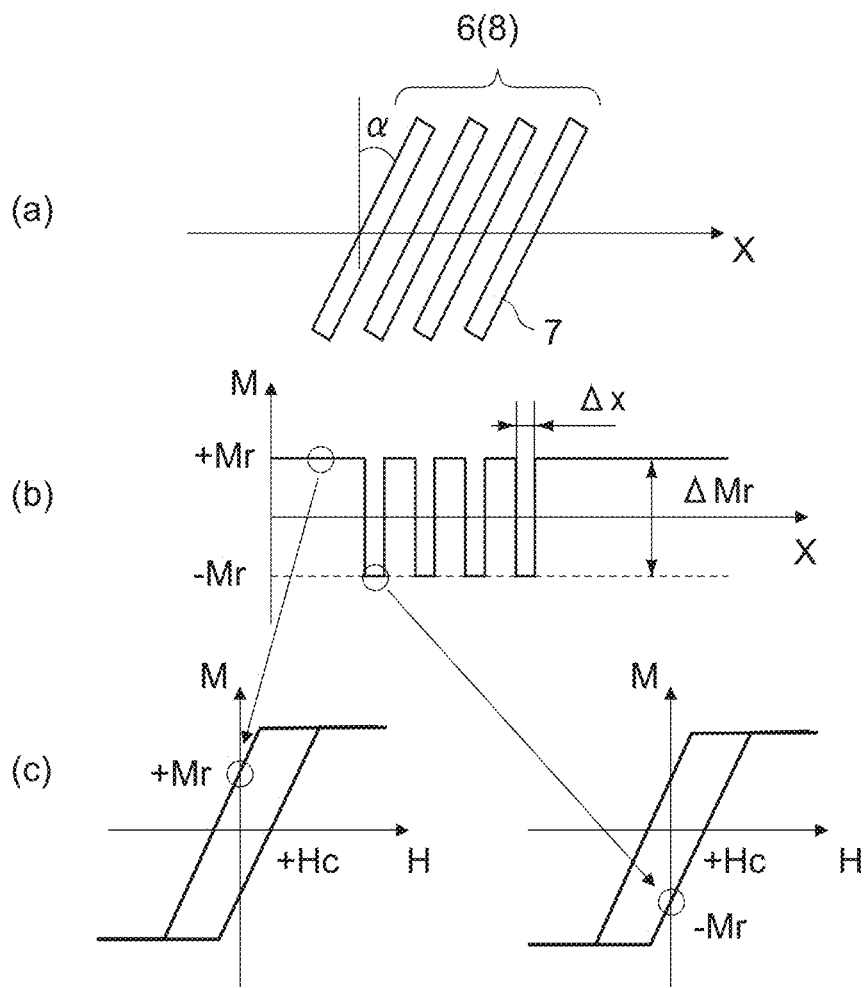
FIG. 11 is a diagram describing a reproduced waveform of a servo signal and the magnitude of the output thereof.

FIG. 11 is a diagram describing the reproduced waveform of the servo signal and the magnitude of the output thereof. Part (a) shows the first stripe group 8 in the servo signal recording pattern 6 recorded on the magnetic layer 13, and Part (b) shows the magnitude of the magnetization of the individual stripe 7 constituting the first stripe group 7.

As shown in Part (b) of FIG. 11, the magnitude of the DC level of the residual magnetization of the magnetic layer 13 after the demagnetization processing by the permanent magnet 12a is defined as +Mr. When the servo signal recording pattern 6 is recorded on the magnetic layer 13 by the servo write head 113, the residual magnetizations M of the region corresponding to the individual stripe 7 changes from a +Mr level to a −Mr level. As shown in Part (c) of FIG. 11, +Mr and −Mr respectively correspond to the magnetization levels in the positive and negative directions of a residual magnetization M when an external magnetic field H is zero in the M-H curve of the magnetic layer 13 (hysteresis). In the figure, He indicates the coercive force.

The reproduction output of the servo signal is proportional to the absolute value of ΔMr corresponding to the difference between the levels of the residual magnetization of the magnetic layer 13 before and after the recording of the servo signal recording pattern 6 (difference between +Mr and −Mr). That is, as ΔMr increases, the reproduction output of a servo reproduction signal increases, resulting in a large SNR. The maximization of ΔMr is achieved by saturation-recording the servo signal recording pattern 6.

Figure 12:
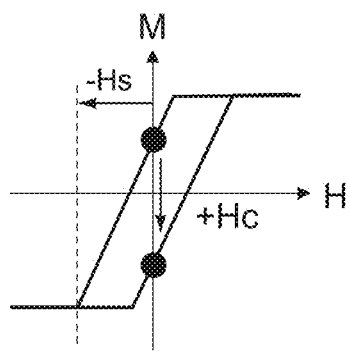
FIG. 12 is a diagram describing an external magnetic field necessary for achieving saturation magnetization of one stripe in the servo signal recording pattern.

Further, as the head magnetic field necessary for saturation-recording the servo signal recording pattern 6, a recording current capable of generating an external magnetic field (−Hs) by which the magnetization of the magnetic layer 13 reaches saturation is supplied from the drive unit 120 to the servo write head 113 as shown in FIG. 12. The magnitude of the recording current is determined by the magnetic properties (residual magnetization, a squareness ratio, the degree of perpendicular orientation, and the like) of the magnetic layer 13.

Meanwhile, since the perpendicular magnetic recording method is affected by the demagnetizing field in the perpendicular direction of the magnetic layer 13, the servo signal recording pattern 6 is not saturation-recorded in some cases even in the case where the head magnetic field for reaching the saturation recording is generated. For this reason, a method of checking whether or not the servo signal recording pattern 6 has been properly written is necessary.

Further, in order to cope with the increase in magnetic tape capacity, the azimuth angle α (see Part (a) of FIG. 11) of each stripe 7 recorded as a servo signal needs to be increased. As a result, since the azimuth loss with the reproduction head unit 114 becomes large, a distance Δx (see Part (b) of FIG. 11) of the reproduction head unit 114 passing through the individual stripe 7 become long. As a result, the output waveform of the reproduction signal is prolonged, and the output level tends to decrease in the course of the signal processing including averaging processing. From also such a viewpoint, it is increasingly necessary to cause the signal recording pattern 6 to be saturation-recorded.

In this regard, in this embodiment, a technology capable of stably providing a magnetic recording medium that is capable of suppressing the degradation of a servo reproduction signal due to the increase in the capacity by defining a unique index in order to properly control the magnetization level of the servo signal recorded on the magnetic layer 13 has been established.

That is, in the present technology, a servo signal is recorded so that an index (Q) represented by $$Sq \times \text{Fact.}(p-p)/F0(p-p)$$

is equal to or greater than a predetermined value, Sq being a squareness ratio of a magnetic layer in the perpendicular direction, F0(p−p) being a peak-to-peak value of the first magnetic force gradient strength observed by a magnetic force microscope when a servo signal is saturation-recorded on the magnetic layer, Fact.(p−p) being a peak-to-peak value of the second magnetic force gradient strength observed by a magnetic force microscope for a servo signal recorded on a servo band.

The value of the index (Q) is 0.42 or more, favorably 0.45 or more, more favorably 0.5 or more, and still more favorably 0.6 or more. By setting the index (Q) to 0.42 or more, it is possible to increase the SNR of a servo reproduction signal, as will be described below.

A squareness ratio (Sq) of the magnetic layer in the perpendicular direction represents the ratio of the residual magnetization to the saturation magnetization of the magnetic layer in the perpendicular direction. The squareness ratio S typically depends on the residual magnetization (Mrt) of the magnetic particles constituting the magnetic layer, the degree of perpendicular orientation, and the like.

The squareness ratio (Sq) is favorably 0.5 or more, more favorably 0.6 or more, more favorably 0.65 or more, and still more favorably 0.7 or more. As a result, the value of the index (Q) can be improved.

The peak-to-peak value (F0(p-p)) of the first magnetic force gradient strength is a peak-to-peak value of a magnetic force gradient strength observed by a magnetic force microscope when the servo signal is saturation-recorded on the servo band of the magnetic layer. The first magnetic force gradient strength corresponds to the ideal value at which the servo signal is recorded without being affected by demagnetization by the demagnetizing field during recording. Hereinafter, referring to FIG. 13, the first magnetic force gradient strength will be described.

Figure 13:
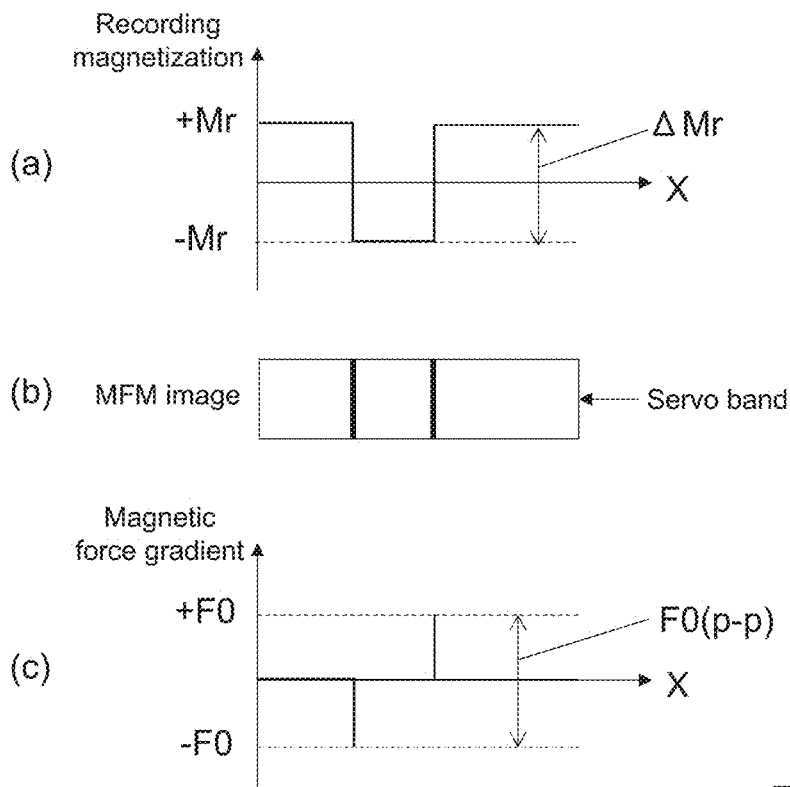
FIG. 13 is an explanatory diagram of a first magnetic force gradient strength for the one stripe.

FIG. 13 is an explanatory diagram of the first magnetic force gradient strength. Part (a) shows the recording magnetization level of one stripe 7 (see Part (a) of FIG. 11) constituting a part of the servo signal, Part (b) shows an MFM (magnetic force microscope) image thereof, and Part (c) shows the peak value of the magnetic force gradient observed in the MFM image.

The magnetic force microscope is a device for visualizing a magnetic domain structure by utilizing a magnetic interaction between a magnetic sample and a magnetic probe, and is used for analyzing a magnetization state of the magnetic sample. The magnetic probe is scanned in the direction perpendicular to the stripe 7. In an ideal condition in which the servo signal is saturation-recorded, two boundary images of the magnetized region and the non-magnetized region corresponding to the inverting portion of the magnetization appears clearly in the MFM image as shown in Part (b) of FIG. 13. As a result, as shown in Part (c) of FIG. 13, the two peak values of the magnetic force gradient at each of the boundary portions are maximized. The magnitude of the magnetic force gradient between these two peaks is defined as a peak-to-peak value (F0(p-p)) of the first magnetic force gradient strength.

Meanwhile, the peak-to-peak value (Fact.(p-p)) of the second magnetic force gradient strength is a peak-to-peak value of the magnetic force gradient strength observed by a magnetic force microscope for the servo signal actually recorded on the servo band by using the servo signal recording device 100 or the like. The second magnetic force gradient strength is typically a magnetic force gradient strength observed by a magnetic force microscope for a servo signal that is not saturation-recorded, and often becomes lower than the first magnetic force gradient strength by being affected by demagnetization by demagnetizing field during recording of the servo signal.

Figure 14:
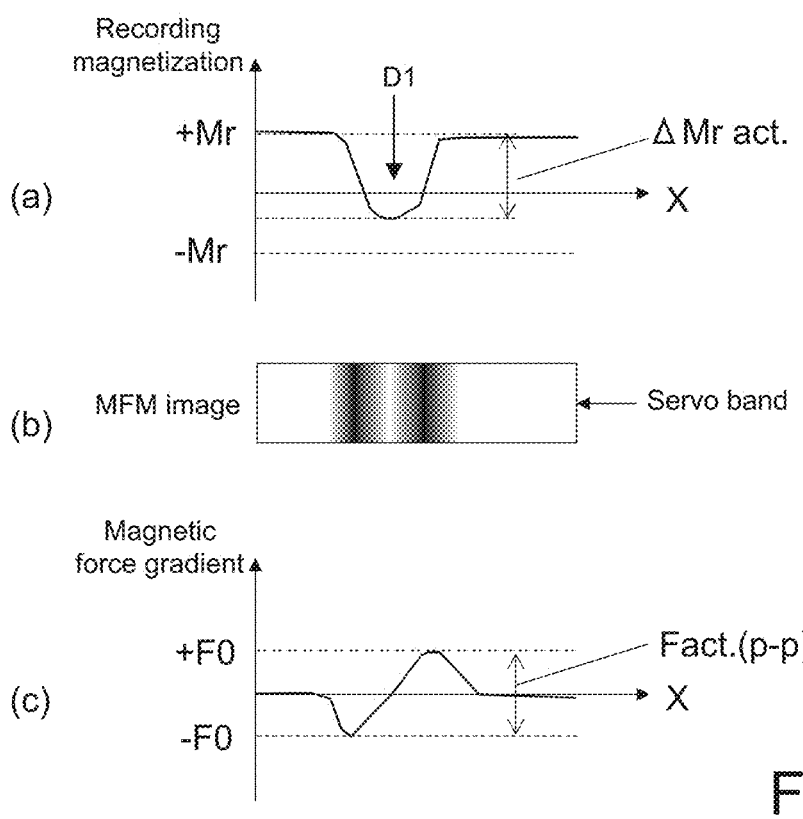
FIG. 14 is an explanatory diagram of a second magnetic force gradient strength for the one stripe.
Figure 15:
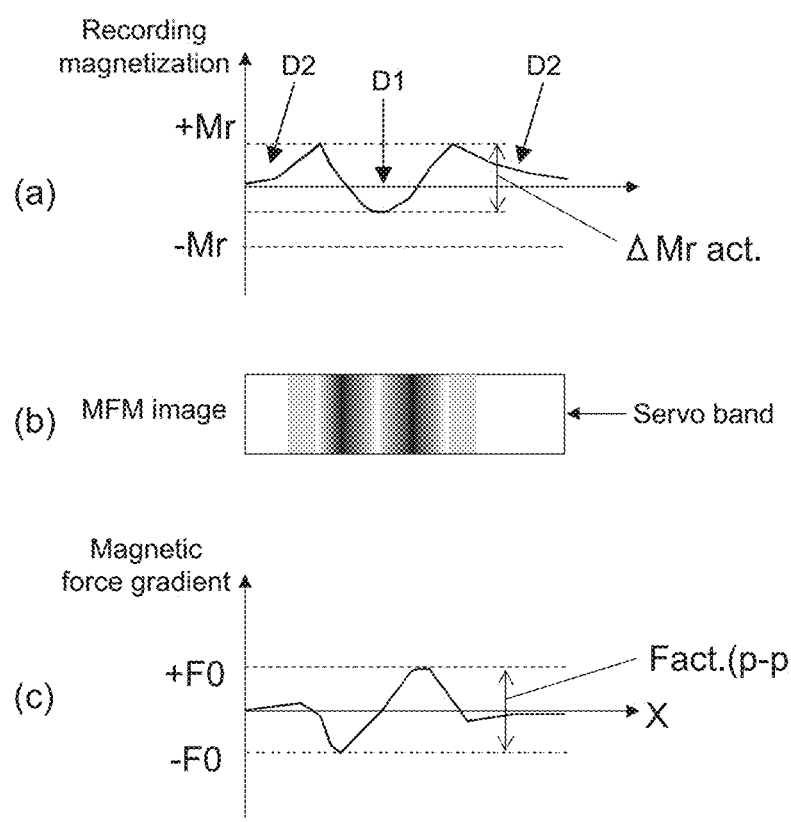
FIG. 15 is another explanatory diagram of the second magnetic force gradient strength for the one stripe.

FIG. 14 and FIG. 15 are each an explanatory diagram of the second magnetic force gradient strength (Fact.(p-p)). Part (a) shows the recording magnetization level of one stripe 7 (see Part (a) of FIG. 11) constituting a part of the servo signal, Part (b) shows the MFM (magnetic force microscope) image thereof, and Part (c) shows the peak value of the magnetic force gradient observed in the MFM image.

The servo signal written to the magnetic layer is usually affected by demagnetization due to the demagnetizing field of the magnetic layer during recording, as indicated by a reference symbol D1 in Part (a) of FIG. 14, and the residual magnetization (-Mr) of the servo signal does not reach the level of the residual magnetization at the time of saturation-recording. Further, in the MFM image, two boundary images corresponding to the inverting portion of the magnetization are blurred as shown in Part (b) of FIG. 14. As a result, as shown in Part (c) of FIG. 14, the peak value of the magnetic force gradient at each boundary portion is reduced. The magnitude (peak-to-peak value) of the magnetic force gradient between these two peaks is defined as a peak-to-peak value (Fact.(p-p)) of the second magnetic force gradient strength.

Note that Parts (a) to (c) of FIG. 14 each represent a state where the residual magnetization level (demagnetization level) of the magnetic layer prior to the servo signal recording has reached the saturation level. In contrast, Parts (a) to (c) of FIG. 15 each represent a state where the residual magnetization level (demagnetization level) of the magnetic layer prior to the servo signal recording has not reached the saturation level. In this case, as shown in Part (a) of FIG. 15, the recording magnetization of the servo signal is affected not only by demagnetization due to the demagnetization field during servo-recording as indicated by the reference symbol D1, but also by demagnetization due to the demagnetization field at the time of demagnetization as indicated by a reference symbol D2. In this case, as shown in Parts (b) and (c) of FIG. 15, when another image appears around the two boundary images corresponding to the inverting portion of the magnetization, the waveform of the magnetic force gradient collapses in some cases in the MFM image. In such a case, the magnitude (peak-to-peak value) of the magnetic force gradient between the highest peaks in the waveform of the magnetic force gradient is defined as a peak-to-peak value (Fact.(p-p)) of the second magnetic force gradient strength.

The ratio (Fact.(p-p)/F0(p-p)) of Fact.(p-p) to F0(p-p) is favorably 0.6 or more, more favorably 0.7 or more, and still more favorably 0.8 or more.

[Servo Signal Recording Device for Saturation-Recording]

Figure 16:
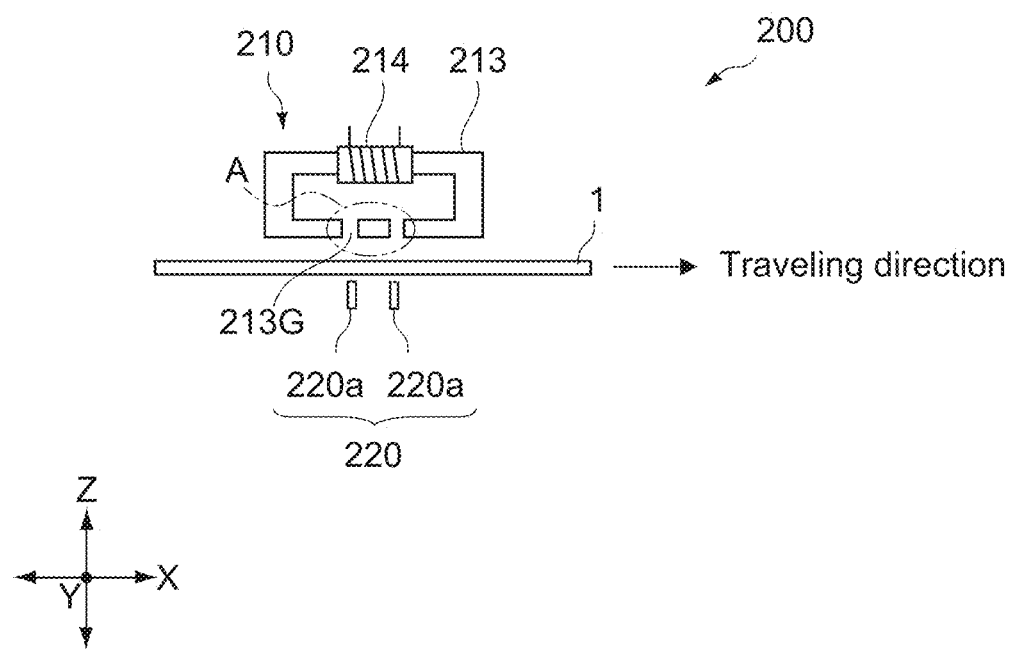
FIG. 16 is a schematic diagram showing a main part of a servo signal recording device according to an embodiment of the present technology.

FIG. 16 is a partial schematic diagram showing a configuration of a servo signal recording device 200 according to an embodiment of the present technology. This servo signal recording device 200 is a novel device suitable for saturation-recording a servo signal.

As shown in FIG. 16, the servo signal recording device 200 includes a servo write head 210 and an auxiliary magnetic pole 220. Since other configurations are similar to those of the servo signal recording device 100 described with reference to FIG. 9, description thereof will be omitted.

The servo write head 210 includes a magnetic core 213 and a coil 214 wound on the magnetic core 213. The magnetic core 213 includes a gap portion 213G for servo signal recording. The magnetic core 213 is formed of a magnetic material having soft magnetic properties. The coil 214 magnetizes the magnetic core 213 by being applied with a recording current supplied from the drive unit 120 (see FIG. 9 and FIG. 10).

Figure 17:
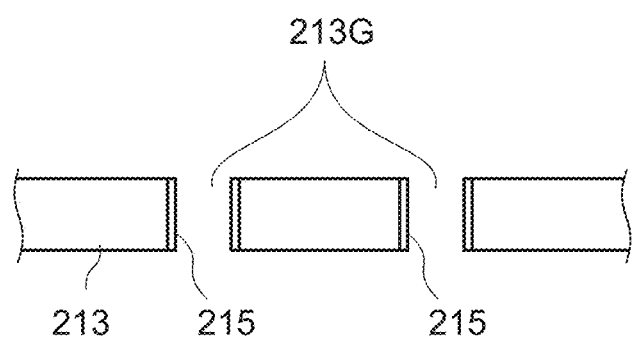
FIG. 17 is an enlarged view of a main part of an A portion in FIG. 16.
Figure 18:
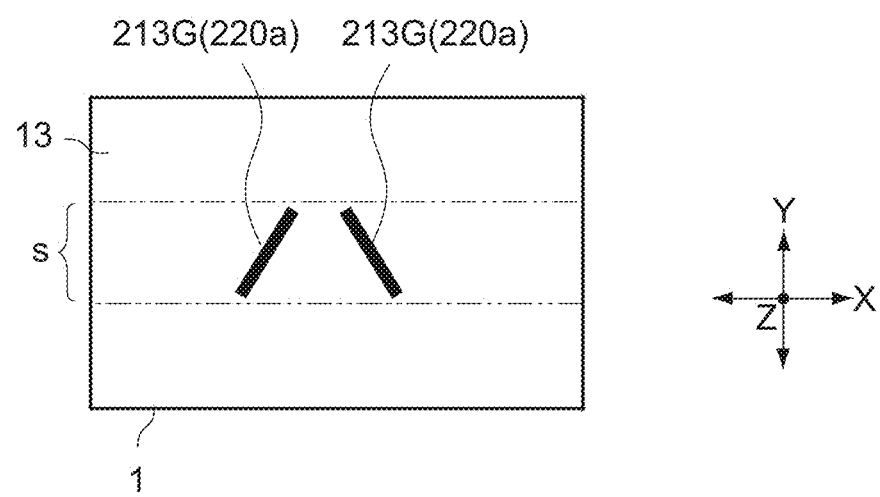
FIG. 18 is a schematic plan view of a main part in FIG. 16.

FIG. 17 is an enlarged view of a main part of an A portion in FIG. 16. FIG. 18 is a schematic plan view showing the region of a part of the servo band s in the magnetic layer 13 of the magnetic recording medium 1.

The soft magnetic material forming the magnetic core 213 is not particularly limited, and an Fe (iron)-Ni (nickel)-based metal magnetic material such as permalloy or a Co (cobalt)-based metal magnetic material is typically used. Alternatively, as shown in FIG. 17, the body of the magnetic core 213 may be formed of permalloy, and the vicinity of a gap portion 213F may be formed of a CoFe-based high permeability material. Examples of the CoFe-based material include a $Co_{1-x}Fe_x$ ($0.6 \leq x \leq 0.8$) based material.

As shown in FIG. 18, the gap portion 213G is formed by forming a groove of a "/" shape and a groove of a "\" shape in the magnetic core 213 at predetermined intervals in the traveling direction of the magnetic recording medium 1, and magnetizes the magnetic layer 13 of the magnetic recording medium 1 traveling directly below the servo write head 210 into the respective shapes by the leakage magnetic field (head magnetic field) from the gap portion 213G. The current applied to the coil 214 is typically a pulse current. By controlling the supplying timing thereof, the servo signal recording pattern 6 including a series of stripe groups 8 and 9 shown in FIG. 2 or FIG. 4 is formed. Note that the azimuth angle α is adjusted by the inclination of each of the grooves constituting the gap portion 213G.

The auxiliary magnetic pole 220 includes a pair of metal pieces 220a disposed to face the servo write head 210 with the magnetic layer 13 of the magnetic recording medium 1 interposed therebetween. As shown in FIG. 18, each of the metal pieces 220a is disposed to be inclined around the Z-axis so as to face the gap portion 213G of the magnetic core 213 in the Z-axis direction. The auxiliary magnetic pole 220 is typically disposed on the back surface (the support 11 or the back layer 14) of the magnetic recording medium 1 in a non-contact manner, but the shorter the facing distance to the gap portion 213G, the more favorable.

Each of the metal piece 220a constituting the auxiliary magnetic pole 220 is formed of a high permeability material, and for example, the above-mentioned CoFe-based material is used. The auxiliary magnetic pole 220 may be provided with a base portion (illustration omitted) for commonly supporting the respective metal pieces 220a in order to improve the handling property.

In the servo signal recording device 200 configured as described above, the servo signal is recorded on the magnetic layer 13 while causing the magnetic recording medium 1 to travel between the servo write head 210 and the auxiliary magnetic pole 220. At this time, the auxiliary magnetic pole 220 forms a magnetic path through which the leakage magnetic field (magnetic flux) from the gap portion 213G passes. As a result, the leakage magnetic field from the gap portion 213G is induced to penetrate through the magnetic recording medium 1 in the thickness direction, the magnetic layer 13 can be easily magnetized in the perpendicular direction. Therefore, in accordance with the servo signal recording device 200, the servo signal can be recorded in a saturation-recorded state or a state close thereto for the following reason.

In the case of performing saturation-recording on the perpendicularly oriented film, it is necessary to apply a recording magnetic field exceeding $Hs=Hc+4\pi Ms$ due to the influence of the demagnetizing field ($4\pi Ms$). For example, in the case where a coercive force Hc is 3,000 Oe and a saturation magnetization Ms is 300 emu/cm$^3$ (value of general perpendicularly oriented barium ferrite), $Hs=Hc+4\pi Ms=6,768$ Oe, and a recording magnetic field twice or more of Hc is necessary. Further, in order to perform saturation-recording, it is generally said that a magnetic field in the gap of the recording head three times or more of Hs is necessary. Therefore, in the case where the material of the recording head is Ni45Fe55 commonly used in the current magnetic tape drive, the magnetic field in the gap is approximately 16,000 Oe, and saturation-recording of the medium having $Hs=6,768$ Oe is difficult.

However, in the case of providing the auxiliary magnetic pole 220, it is considered that since the surface magnetization induced in the magnetic film surface is suppressed and the effect of cancelling the demagnetizing field of 4nMs is obtained, $Hs=Hc$ and saturation-recording becomes possible.

EXAMPLE

Next, various Examples and various Comparative Examples in the present technology will be described.

Example 1

A magnetic recording medium including a magnetic layer that contains barium ferrite as a magnetic powder and has a thickness of 80 nm with the residual magnetization (Mrt) of 0.55 memu/cm$^2$ and the squareness ratio (Sq) of 0.7 (70%) in the perpendicular direction was prepared. A servo signal including a servo signal recording pattern with an azimuth angle of 12° was recorded on the magnetic layer by using a first servo signal recording device (see FIG. 16) including an auxiliary magnetic pole (CoFe-based one, the same applies hereinafter) while causing the prepared magnetic recording medium to travel at 5 m/s. The servo write head was formed of Permalloy (Ni45Fe55), and a step signal with a recording current of 100% was used as the recording signal. The recording current of 100% refers to the recording current value at which the reproduction signal voltage becomes the maximum when the reproduction signal voltage is monitored while changing the recording current.

The servo signal recorded in the above-mentioned manner can be regarded as being saturation-recorded on the magnetic layer due to the action of the above-mentioned auxiliary magnetic pole. In this regard, in this Example, the peak-to-peak value of the magnetic force gradient strength obtained from the MFM image of the magnetic layer on which the servo signal was recorded was used as the peak-to-peak value (F0(p–p)) of the first magnetic force gradient strength obtained when the servo signal was saturation-recorded.

Next, using a second servo signal recording device that does not include the auxiliary magnetic pole, a servo signal with an azimuth angle of 12° was recorded by applying a step signal with a recording current of 100% to the servo write head while causing the above-mentioned magnetic recording medium to travel in the tape longitudinal direction at 5 m/s. The second servo signal recording device has the same configuration as that of the above-mentioned first servo signal recording device except that it does not include the auxiliary magnetic pole.

Then, the MFM image of the magnetic layer on which a servo signal had been recorded under the above-mentioned condition was acquired, and the peak-to-peak value (Fact.(p–p)) of the second magnetic force gradient strength, which was a magnetic force gradient strength of the servo signal, was measured from the obtained MFM-image.

Note that F0(p–p) and Fact.(p–p) were measured using the magnetic force microscope "NanoScope III A D3100" manufactured by Bruker.

The measurement conditions are shown below.
Measuring mode: Phase Mode
  Scan speed: 1.0 Hz
  Number of data points: 512×512
Further, the probe MFMR manufactured by NanoWorld was used.

Subsequently, when Fact.(p–p)/F0(p–p), which was the ratio of Fact.(p–p) to F0(p–p), was calculated from the measured value of Fact.(p–p), the value was 0.7 and the value of the index (Q), which was the product of the ratio and the squareness ratio (Sq) of the magnetic layer, was 0.49.

Next, the servo signal of the magnetic recording medium used for the measurement of Fact.(p–p) was reproduced and the SNR was measured. For the measurement, the signal of the reproduction head unit provided in the servo signal recording device was used. The measured value was a relative value when the SNR of a servo reproduction signal of the magnetic tape in the commercially available LTO7 format was 0 dB. As a result of the measurement, the SNR was 2.0 dB.

Example 2

A servo signal was recorded under the same condition as that in Example 1 except that the second servo signal recording device that does not include the auxiliary magnetic pole was used for the magnetic layer of the magnetic recording medium formed of the same material as that in Example 1 and the recording current was set to 90%. An MFM image of the recorded servo signal was acquired, and the peak-to-peak value of the magnetic force gradient strength of the servo signal was measured from the MFM image and used as the peak-to-peak value (Fact.(p–p)) of the second magnetic force gradient strength of the servo signal in the magnetic recording medium.

When Fact.(p–p)/F0(p–p), which was the ratio of Fact.(p–p) of the servo signal to F0(p–p) measured in Example 1, was calculated, the value was 0.65, and the value of the index (Q), which was the product of the ratio and the squareness ratio (Sq) of the magnetic layer, was 0.455. Further, when the servo signal was reproduced under the same condition as that in Example 1 to measure the SNR, the measured value was 1.0 dB.

Example 3

A servo signal was recorded under the same condition as that in Example 1 except that the second servo signal recording device that does not include the auxiliary magnetic pole was used for the magnetic layer of the magnetic recording medium formed of the same material as that in Example 1 and the recording current was set to 80%. An MFM image of the recorded servo signal was acquired, and the peak-to-peak value of the magnetic force gradient strength of the servo signal was measured from the MFM image and used as the peak-to-peak value (Fact.(p–p)) of the second magnetic force gradient strength of the servo signal.

When Fact.(p–p)/F0(p–p), which was the ratio of Fact.(p–p) of the servo signal to F0(p–p) measured in Example 1, was calculated, the value was 0.6, and the value of the index (Q), which was the product of the ratio and the squareness ratio (Sq) of the magnetic layer, was 0.42. Further, when the servo signal was reproduced under the same condition as that in Example 1 to measure the SNR, the measured value was 0.0 dB.

Example 4

A magnetic recording medium including a magnetic layer that contains barium ferrite as a magnetic powder and has a thickness of 80 nm with the residual magnetization (Mrt) of 0.45 memu/cm$^2$ and the squareness ratio (Sq) of 0.6 (60%) in the perpendicular direction was prepared. A servo signal including a servo signal recording pattern with an azimuth angle of 12° was recorded on the magnetic layer by using the first servo signal recording device including the auxiliary magnetic pole while causing the prepared magnetic recording medium at 5 m/s. The servo write head was formed of permalloy, and a step signal with a recording current of 100% was used as the recording signal.

The servo signal recorded in the above-mentioned manner can be regarded as being saturation-recorded on the magnetic layer due to the action of the above-mentioned auxiliary magnetic pole. In this regard, in this Example, the peak-to-peak value of the magnetic force gradient strength obtained from the MFM image of the magnetic layer on which the servo signal was recorded was used as the peak-to-peak value (F0(p–p)) of the first magnetic force gradient strength obtained when the servo signal was saturation-recorded.

Next, using the second servo signal recording device that does not include the auxiliary magnetic pole, a servo signal with an azimuth angle of 12° was recorded by applying a step signal with a recording current of 100% to the servo write head while causing the above-mentioned magnetic recording medium to travel in the tape longitudinal direction at 5 m/s.

Then, the MFM image of the magnetic layer on which the servo signal was recorded under the above-mentioned condition was acquired, and the peak-to-peak value (Fact.(p–p)) of the second magnetic force gradient strength, which was a magnetic force gradient strength of the servo signal, was measured from the obtained MFM image.

Subsequently, when Fact.(p–p)/F0(p–p), which was the ratio of Fact.(p–p) to F0(p–p), was calculated from the measured value of Fact.(p–p), the value was 0.7 and the value of the index (Q), which was the product of the ratio and the squareness ratio (Sq) of the magnetic layer, was 0.42. Further, when the servo signal was reproduced under the same condition as that in Example 1 to measure the SNR, the measured value was 0.0 dB.

Example 5

A magnetic recording medium including a magnetic layer that contains barium ferrite as a magnetic powder and has a thickness of 80 nm with the residual magnetization (Mrt) of 0.39 memu/cm$^2$ and the squareness ratio (Sq) of 0.5 (50%) in the perpendicular direction was prepared. A servo signal including a servo signal recording pattern with an azimuth angle of 12° was recorded on the magnetic layer by using the first servo signal recording device including the auxiliary magnetic pole while causing the prepared magnetic recording medium at 5 m/s. The servo write head was formed of permalloy, and a step signal with a recording current of 100% was used as the recording signal.

The servo signal recorded in the above-mentioned manner can be regarded as being saturation-recorded on the magnetic layer due to the action of the above-mentioned auxiliary magnetic pole. In this regard, in this Example, the peak-to-peak value of the magnetic force gradient strength obtained from the MFM image of the magnetic layer on which the servo signal was recorded was used as the peak-to-peak value (F0(p–p)) of the first magnetic force gradient strength obtained when the servo signal was saturation-recorded.

Next, using the first servo signal recording device including the auxiliary magnetic pole, a servo signal with an azimuth angle of 12° was recorded by applying a step signal with a recording current of 90% to the servo write head while causing the above-mentioned magnetic recording medium to travel in the tape longitudinal direction at 5 m/s.

Then, the MFM image of the magnetic layer on which the servo signal was recorded under the above-mentioned condition was acquired, and the peak-to-peak value (Fact.(p–p)) of the second magnetic force gradient strength, which was a magnetic force gradient strength of the servo signal, was measured from the obtained MFM image.

Subsequently, when Fact.(p–p)/F0(p–p), which was the ratio of Fact.(p–p) to F0(p–p), was calculated from the measured value of Fact.(p–p), the value was 0.9 and the value of the index (Q), which was the product of the ratio and the squareness ratio (Sq) of the magnetic layer, was 0.45. Further, when the servo signal was reproduced under the same condition as that in Example 1 to measure the SNR, the measured value was 0.8 dB.

Comparative Example 1

A servo signal was recorded under the same condition as that in Example 1 except that the second servo signal recording device that does not include the auxiliary magnetic pole was used for the magnetic layer of the magnetic recording medium formed of the same material as that in Example 1 and the recording current was set to 70%. An MFM image of the recorded servo signal was acquired, and the peak-to-peak value of the magnetic force gradient strength of the servo signal was measured from the MFM image and used as the peak-to-peak value (Fact.(p–p)) of the second magnetic force gradient strength of the servo signal in the magnetic recording medium.

When Fact.(p–p)/F0(p–p), which was the ratio of Fact.(p–p) of the servo signal to F0(p–p) measured in Example 1, was calculated, the value was 0.5 and the value of the index (Q), which was the product of the ratio and the squareness ratio (Sq) of the magnetic layer, was 0.35. Further, when the servo signal was reproduced under the same condition as that in Example 1 to measure the SNR, the measured value was −2.0 dB.

Comparative Example 2

A servo signal was recorded under the same condition as that in Example 5 except that the first servo signal recording device including the auxiliary magnetic pole was used for the magnetic layer of the magnetic recording medium formed of the same material as that in Example 5 and the recording current was set to 80%. An MFM image of the recorded servo signal was acquired, and the peak-to-peak value of the magnetic force gradient strength of the servo signal was measured from the MFM image and used as the peak-to-peak value (Fact.(p–p)) of the second magnetic force gradient strength of the servo signal in the magnetic recording medium.

When Fact.(p–p)/F0(p–p), which was the ratio of Fact.(p–p) of the servo signal to F0(p–p) measured in Example 5, was calculated, the value was 0.8 and the value of the index (Q), which was the product of the ratio and the squareness ratio (Sq) of the magnetic layer, was 0.4. Further, when the servo signal was reproduced under the same condition as that in Example 1 to measure the SNR, the measured value was −0.5 dB.

Comparative Example 3

A servo signal was recorded under the same condition as that in Example 5 except that the second servo signal recording device that does not include the auxiliary magnetic pole was used for the magnetic layer of the magnetic recording medium formed of the same material as that in Example 5 and the recording current was set to 100%. An MFM image of the recorded servo signal was acquired, and the peak-to-peak value of the magnetic force gradient strength of the servo signal was measured from the MFM image and used as the peak-to-peak value (Fact.(p–p)) of the second magnetic force gradient strength of the servo signal in the magnetic recording medium.

When Fact.(p–p)/F0(p–p), which was the ratio of Fact.(p–p) of the servo signal to F0(p–p) measured in Example 5, was calculated, the value was 0.7 and the value of the index (Q), which was the product of the ratio and the squareness ratio (Sq) of the magnetic layer, was 0.35. Further, when the servo signal was reproduced under the same condition as that in Example 1 to measure the SNR, the measured value was −2.0 dB.

Comparative Example 4

A magnetic recording medium including a magnetic layer that contains barium ferrite as a magnetic powder and has a thickness of 80 nm with the residual magnetization (Mrt) of 0.35 memu/cm$^2$ and the squareness ratio (Sq) of 0.45 (45%) in the perpendicular direction was prepared. A servo signal including a servo signal recording pattern with an azimuth angle of 12° was recorded on the magnetic layer by using the first servo signal recording device including the auxiliary magnetic pole while causing the prepared magnetic recording medium at 5 m/s. The servo write head was formed of permalloy, and a step signal with a recording current of 100% was used as the recording signal.

The servo signal recorded in the above-mentioned manner can be regarded as being saturation-recorded on the magnetic layer due to the action of the above-mentioned auxiliary magnetic pole. In this regard, in this Example, the peak-to-peak value of the magnetic force gradient strength obtained from the MFM image of the magnetic layer on which the servo signal was recorded was used as the peak-to-peak value (F0(p–p)) of the first magnetic force gradient strength obtained when the servo signal was saturation-recorded.

Next, using the second servo signal recording device that does not include the auxiliary magnetic pole, a servo signal with an azimuth angle of 12° was recorded by applying a step signal with a recording current of 100% to the servo write head while causing the above-mentioned magnetic recording medium to travel in the tape longitudinal direction at 5 m/s.

Then, the MFM image of the magnetic layer on which the servo signal was recorded under the above-mentioned condition was acquired, and the peak-to-peak value (Fact.(p–p)) of the second magnetic force gradient strength, which was a magnetic force gradient strength of the servo signal, was measured from the obtained MFM image.

Subsequently, when Fact.(p–p)/F0(p–p), which was the ratio of Fact.(p–p) to F0(p–p), was calculated from the measured value of Fact.(p–p), the value was 0.7 and the value of the index (Q), which was the product of the ratio and the squareness ratio (Sq) of the magnetic layer, was 0.315. Further, when the servo signal was reproduced under the same condition as that in Example 1 to measure the SNR, the measured value was −2.5 dB.

Conditions and results of Examples 1 to 5 and Comparative Examples 1 to 3 are summarized in Table 1.

TABLE 1

| | Residual magnetization Mrt (memu/cm$^2$) | Squareness ratio Sq ⊥ | Recording current (%) | Soft magnetic auxiliary magnetic pole | Fact.(p-p)/F0(p-p) | Sq * Fact.(p-p)/F0(p-p) | SNR(dB) |
|---|---|---|---|---|---|---|---|
| Example 1 | 0.55 | 0.7 | 100 | Not include | 0.7 | 0.49 | 2.0 |
| Example 2 | 0.55 | 0.7 | 90 | Not include | 0.65 | 0.455 | 1.0 |
| Example 3 | 0.55 | 0.7 | 80 | Not include | 0.6 | 0.42 | 0.0 |
| Example 4 | 0.45 | 0.6 | 100 | Not include | 0.7 | 0.42 | 0.0 |
| Example 5 | 0.39 | 0.5 | 90 | Include | 0.9 | 0.45 | 0.8 |
| Comparative Example 1 | 0.55 | 0.7 | 70 | Not include | 0.5 | 0.35 | −2.0 |
| Comparative Example 2 | 0.39 | 0.5 | 80 | Include | 0.8 | 0.4 | −0.5 |
| Comparative Example 3 | 0.39 | 0.5 | 100 | Not include | 0.7 | 0.35 | −2.0 |
| Comparative Example 4 | 0.35 | 0.45 | 100 | Not include | 0.7 | 0.315 | −2.5 |

Figure 19:
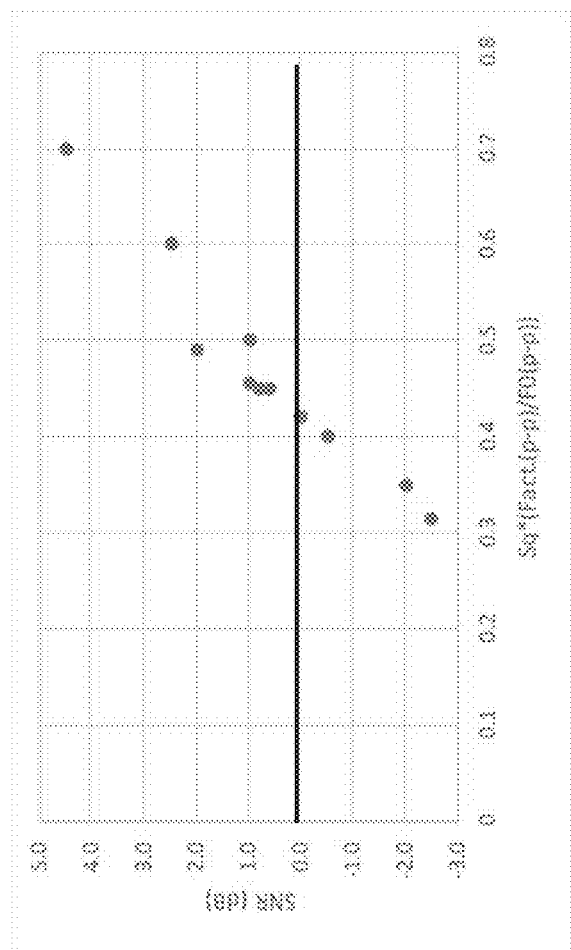
FIG. 19 is a diagram showing the results of Example and Comparative Example.

As shown in Table 1, the SNRs for the servo reproduction signals in Examples 1 to 5 in which the value of the index Q, which was the product of the squareness ratio (Sq) in the perpendicular direction of the magnetic layer and the ratio of the magnetic force gradient strength of the servo signal (Fact.(p−p)/F0(p−p)), was 0.42 or more, were all 0 dB or higher, and comparable or better results were obtained as compared with the SNR of the servo reproduction signal of the magnetic recording medium employed in LTO7. FIG. 19 shows the relationship between the SNR and the index Q.

In particular, in Examples 1, 2, and 5 in which the value of the index Q is 0.45 or more (rounded to the first decimal place), since SNRs of 0.8 dB or more are obtained, it is expected that favorable SNRs can be ensured even when the azimuth angle of the servo signal increases as the capacity of the magnetic recording medium increases.

Further, by adopting the first servo signal recording device including the auxiliary magnetic pole for recording a servo signal, the index Q can be made higher than when the second servo signal recording device that does not include the auxiliary magnetic pole is employed. This is presumably because by a further increase in the magnetic susceptibility of the magnetic layer in the perpendicular direction due to the inductive action of the magnetic flux by the auxiliary magnetic pole, the saturation magnetization of the servo signal or a condition close to this was realized, leading to an increased index Q.

As described above, by referring to the index Q, which is the product of the squareness ratio (Sq) in the perpendicular direction of the magnetic layer and the ratio of the magnetic force gradient strength of the servo signal (Fact.(p−p)/F0 (p−p)), it is possible to estimate the magnetized state of the servo signal of the magnetic recording medium and the SNR of the reproduction signal. As a result, it is possible to easily manage the magnetic recording medium and provide a magnetic recording medium capable of realizing high SNRs of a servo reproduction signal. Further, it is possible to suppress the degradation of the SNRs of a servo reproduction signal due to the increase in the capacity of the magnetic recording medium.

<Details of Magnetic Recording Medium>

Subsequently, details of the magnetic recording medium 1 will be described.

[Base Material]

The base material 11 is a non-magnetic support that supports the non-magnetic layer 12 and the magnetic layer 13. The base material 11 has a long film-like shape. The upper limit value of the average thickness of the base material 11 is 4.0 µm, favorably 4.2 µm, more favorably 3.8 µm, and still more favorably 3.4 µm. In the case where the upper limit value of the average thickness of the base material 11 is 4.2 µm or less, it is possible to increase the recording capacity in one cartridge 21 (see FIG. 5) as compared with the typical magnetic recording medium.

The average thickness of the base material 11 is determined as follows. First, the magnetic recording medium 1 having a ½ inch width is prepared and cut into a length of 250 mm to prepare a sample. Subsequently, the layers (i.e. the non-magnetic layer 12, the magnetic layer 13, and the back layer 14) other than the base material 11 of the sample are removed with a solvent such as MEK (methylethylketone) and dilute hydrochloric acid. Next, using a laser hologage manufactured by Mitutoyo as a measurement device, the thickness of the sample (base material 11) is measured at five or more points, and the measured values are simply averaged (arithmetically averaged) to calculate the average thickness of the base material 11. Note that the measurement positions are randomly selected from the sample.

The base material 11 contains, for example, at least one selected from the group consisting of polyesters, polyolefins, cellulose derivatives, vinyl resins, and different polymer resins. In the case where the base material 11 contains two or more of the above-mentioned materials, the two or more materials may be mixed, copolymerized, or stacked.

The polyesters include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins include, for example, at least one of PE (polyethylene) or PP (polypropylene). The cellulose derivatives include, for example, at least one of cellulose diacetate, cellulose triacetate, CAB (cellulose acetate butyrate), and CAP (cellulose acetate propionate). The vinyl resins include, for example, at least one of PVC (polyvinyl chloride) or PVDC (polyvinylidene chloride).

The different polymer resins include, for example, at least one PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, e.g., Zylon (registered trademark)), polyether, PEK (polyetherketone), PEEK (polyetheretherketone), polyetherester, PES (polyethersulfone), PEI (polyetherimide), PSF (polysulfone), PPS (polyphenylene sulfide), PC (polycarbonate), PAR (polyarylate), and PU (polyurethane).

[Magnetic Layer]

The magnetic layer 13 is a recording layer for recording data signals. The magnetic layer 13 contains a magnetic powder, a binder, conductive particles, and the like. The magnetic layer 13 may further contain additives such as a lubricant, an abrasive, and a rust inhibitor, as necessary. The magnetic layer 13 has a surface in which a large number of holes are provided. The lubricant is stored in the large number of holes. It is favorable that the large number of holes extend in the direction perpendicular to the surface of magnetic layer.

The thickness of the magnetic layer 13 is typically 35 nm or more and 90 nm or less. By setting the thickness of the magnetic layer 13 to 35 nm or more and 90 nm or less as described above, it is possible to improve the electromagnetic conversion characteristics. Further, from the viewpoint of full width at half maximum of the isolated waveform in the reproduced waveform of the servo signal, the thickness of the magnetic layer 13 is favorably 90 nm or less, more favorably 80 nm or less, more favorably 60 nm or less, more favorably 50 nm or less, and still more favorably 40 nm or less. When the thickness of the magnetic layer 13 is set to 90 nm or less, the peak of the reproduced waveform of the servo signal can be sharpened by narrowing the full width at half maximum of the isolated waveform in the reproduced waveform of the servo signal (to 195 nm or less). Since this improves the accuracy of reading the servo signal, the number of recording tracks be increased to improve the recording density of data.

The thickness of the magnetic layer 13 can be obtained, for example, in the following manner. First, the magnetic recording medium 1 is thinly processed perpendicular to the main surface thereof to prepare a sample piece, and the cross section of the test piece is observed by a transmission electron microscope (TEM) under the following conditions.

Device: TEM (H9000NAR manufactured by Hitachi, Ltd.)
Acceleration voltage: 300 kV
Magnification: 100,000 times Next, after measuring the thickness of the magnetic layer 13 at least 10 points in the longitudinal direction of the magnetic recording medium 10 using the obtained TEM image, the measured values are simply averaged (arithmetically averaged) to obtain the thickness of the magnetic layer 13. Note that the measurement positions are randomly selected from the sample piece.

(Magnetic Powder)

The magnetic powder contains a powder of nanoparticles containing ε-iron oxide (hereinafter, referred to as "ε-iron oxide particles"). The ε-iron oxide particles are capable of achieving a high coercive force even if the ε-iron oxide particles are fine particles. It is favorable that the ε-iron oxide contained in the ε-iron oxide particles is preferentially crystallographically oriented in the thickness direction (perpendicular direction) of the magnetic recording medium 1.

The ε-iron oxide particles have a spherical shape or substantially spherical shape, or a cubic shape or substantially cubic shape. Since the ε-iron oxide particles have the above-mentioned shapes, the area of contact between the particles in the thickness direction of the magnetic recording medium 1 can be reduced, and the aggregation of the particles can be suppressed when ε-iron oxide particles are used as the magnetic particles, as compared with the case where hexagonal plate-shaped barium ferrite particles are used as the magnetic particles. Therefore, it is possible to increase the dispersibility of the magnetic powder and achieve a more favorable SNR (Signal-to-Noise Ratio).

The ε-iron oxide particles have a core-shell structure. Specifically, the ε-iron oxide particles include a core portion, and a shell portion that has a two-layer structure and is provided around the core portion. The shell portion having a two-layer structure includes a first shell portion provided on the core portion, and a second shell portion provided on the first shell portion.

The core portion contains ε-iron oxides. The ε-iron oxide contained in the core portion favorably has ε-$Fe_2O_3$ crystal as the main phase, and has more favorably a single phase of ε-$Fe_2O_3$.

The first shell portion covers at least a part of the periphery of the core portion. Specifically, the first shell portion may partially cover the periphery of the core portion, or may cover the entire periphery of the core portion. From the viewpoint of make exchange coupling of the core portion and the first shell portion sufficient and improving the magnetic properties, the first shell portion favorably covers the entire surface of the core portion 21.

The first shell portion is a so-called soft magnetic layer, and contains, for example, a soft magnetic material such as α-Fe, a Ni—Fe alloy, or a Fe—Si—Al alloy. α-Fe may be obtained by reducing the ε-iron oxide contained in the core portion 21.

The second shell portion is an oxide coating film as an oxidation prevention layer. The second shell portion contains α-iron oxide, aluminum oxide, or silicon oxide. The α-iron oxide includes, for example, at least one iron oxide selected from the group consisting of $Fe_3O_4$, $Fe_2O_3$ and FeO. In the case where the first shell portion contains α-Fe (soft magnetic material), the α-iron oxide may be one obtained by oxidizing α-Fe contained in the first shell portion 22a.

Since the ε-iron oxide particles includes first shell portion as described above the coercive force Hc of the ε-iron oxide particles (core shell particles) as a whole can be adjusted to a coercive force Hc suitable for recording while keeping the coercive force Hc of the core portion alone at a large value in order to ensure high thermal stability. Further, since the ε-iron oxide particles includes the second shell portion as described above, the ε-iron oxide particles are exposed to air and rust or the like is generated on the surfaces of the particles during and before the process of producing the magnetic recording medium, thereby making it possible to suppress the deterioration of the characteristics of the ε-iron oxide particles. Therefore, it is possible to suppress the deterioration of the characteristics of the magnetic recording medium 1.

The average particle size (average maximum particle size) of the magnetic powder is favorably 22 nm or less, more favorably 8 nm or more and 22 nm or less, and still more favorably 12 nm or more and 22 nm or less.

The average aspect ratio of the magnetic powder is favorably 1 or more and 2.5 or less, more favorably 1 or more and 2.1 or less, and still more favorably 1 or more and 1.8 or less. When the average aspect ratio of the magnetic powder is within the range of 1 or more and 2.5 or less, aggregation of the magnetic powder can be suppressed, and the resistivity applied to the magnetic powder can be suppressed when the magnetic powder is perpendicularly oriented in the process of forming the magnetic layer 13. Therefore, the perpendicular orientation of the magnetic powder can be improved.

The average volume (particle volume) Vave of the magnetic powder is favorably 2,300 nm³ or less, more favorably 2,200 nm³ or less, more favorably 2,100 nm³ or less, more favorably 1,950 nm³ or less, more favorably 1,600 nm³ or less, and still more favorably 1,300 nm³ or less. When the average volume Vave of the magnetic powder is 2,300 nm³ or less, the peak of the reproduced waveform of the servo signal can be sharpened by narrowing the full width at half maximum of the isolated waveform in the reproduced waveform of the servo signal (to 195 nm or less). This improves the accuracy of reading the servo signal, so that the recording density of data can be improved by increasing then number of recording tracks (as will be described in detail later). Note that the smaller the average volume Vave of the magnetic powder, the better. Thus, the lower limit value of the volume is not particularly limited. However, for example, the lower limit value is 1000 nm³ or more.

The average particle size, the average aspect ratio, and the average volume Vave of the above-mentioned magnetic powder are obtained as follows (e.g., in the case where the magnetic powder has a shape such as a spherical shape as in the ε-iron oxide particles). First, the magnetic recording medium 1 to be measured is processed by the FIB (Focused Ion Beam) method or the like to prepare a slice, and the cross-section of the slice is observed by TEM. Next, 50 magnetic powders are randomly selected from the obtained TEM photograph, and a major axis length DL and a minor axis length DS of each of the magnetic powder are measured. Here, the major axis length DL means the largest one (so-called maximum Feret diameter) of the distances between two parallel lines drawn from all angles so as to be in contact with the contour of the magnetic powder. Meanwhile, the minor axis length DS means the largest one of the lengths of the magnetic powder in a direction perpendicular to the major axis of the magnetic powder.

Subsequently, the measured major axis lengths DL of the 50 magnetic powders are simply averaged (arithmetically averaged) to obtain an average major axis length DLave. Then, the average major axis length DLave obtained in this manner is used as the average particle size of the magnetic powder. Further, the measured minor axis lengths DS of the 50 magnetic powders are simply averaged (arithmetically averaged) to obtain an average minor axis length DSave. Next, an average aspect ratio (DLave/DSave) of the magnetic powder is obtained on the basis of the average major axis length DLave and the average minor axis length DSave.

Next, an average volume (particle volume) Vave of the magnetic powder is obtained from the following formula by using the average major axis length DLave.

$$V\text{ave}=\pi/6 \times DL\text{ave}^3$$

In this description, the case where the ε-iron oxide particles include a shell portion having a two-layer structure has been described. However, the ε-iron oxide particles may include a shell portion having a single-layer structure. In this case, the shell portion has a configuration similar to that of the first shell portion. However, from the viewpoint of suppressing the characteristic deterioration of the ε-iron oxide particles, it is favorable that the ε-iron oxide particles include a shell portion having a two-layer structure as described above.

In the above description, the case where the ε-iron oxide particles have a core-shell structure has been described. However, the ε-iron oxide particles may contain an additive instead of the core-shell structure, or may contain an additive while having a core-shell structure. In this case, some Fe of the ε-iron oxide particles are substituted by the additives.

Also by causing the ε-iron oxide particles to contain an additive, the coercive force Hc of the ε-iron oxide particles as a whole can be adjusted to a coercive force Hc suitable for recording, and thus, the ease of recording can be improved. The additive is a metal element other than iron, favorably, a trivalent metal element, more favorably at least one of Al, Ga, or In, and still more favorably at least one of Al or Ga.

Specifically, the ε-iron oxide containing the additive is ε-Fe$_{2-x}$M$_x$O$_3$ crystal (However, M represents a metal element other than iron, favorably a trivalent metal element, more favorably at least one of Al, Ga or In, and still more favorably at least one of Al or Ga. x satisfies the following formula represented by: 0<x<1, for example).

The magnetic powder may contain a powder of nanoparticles (hereinafter, referred to as "hexagonal ferrite particles".) containing hexagonal ferrite. The hexagonal ferrite particles have, for example, a hexagonal plate shape or a substantially hexagonal plate shape. The hexagonal ferrite favorably contains at least one of Ba, Sr, Pb, or Ca, more favorably at least one of Ba or Sr. The hexagonal ferrite may specifically be, for example, barium ferrite or strontium ferrite. Barium ferrite may further contain at least one of Sr, Pb, or Ca, in addition to Ba. Strontium ferrite may further contain at least one of Ba, Pb, or Ca, in addition to Sr.

More specifically, the hexagonal ferrite has an average composition represented by the following general formula represented by: MFe$_{12}$O$_{19}$. However, M represents, for example, at least one metal selected from the group consisting of Ba, Sr, Pb, and Ca, favorably at least one metal selected from the group consisting of Ba and Sr. M may represent a combination of Ba and one or more metals selected from the group consisting of Sr, Pb, and Ca. Further, M may represent a combination of Sr and one or more metals selected from the group consisting of Ba, Pb, and Ca. In the above-mentioned general formula, some Fe may be substituted by other meatal elements.

In the case where the magnetic powder contains a powder of hexagonal ferrite particles, the average particle size of the magnetic powder is favorably 50 nm or less, more favorably 10 nm or more and 40 nm or less, and still more favorably 15 nm or more and 30 nm or less. In the case where the magnetic powder contains a powder of hexagonal ferrite particles, the average aspect ratio of the magnetic powder and the average volume Vave of the magnetic powder are as described above.

Note that the average particle size, the average aspect ratio, and the average volume Vave of the magnetic powder are obtained as follows (e.g., in the case where the magnetic powder has a plate-like shape as in hexagonal ferrite). First, the magnetic recording medium 1 to be measured is processed by the FIB method or the like to produce a slice, and the cross-section of the slice is observed by TEM. Next, 50 magnetic powders oriented at an angle of 75 degrees or more with respect to the horizontal direction are randomly selected from the obtained TEM photograph, and a maximum plate thickness DA of each magnetic powder is measured. Subsequently, the measured maximum plate thicknesses DA of the 50 magnetic powders are simply averaged (arithmetically averaged) to obtain an average maximum plate thickness DAave.

Next, the surface of the magnetic layer 13 of the magnetic recording medium 1 is observed by TEM. Next, 50 magnetic powders are randomly selected from the obtained TEM photograph, and a maximum plate diameter DB of each magnetic powder is measured. Here, the maximum plate diameter DB means the largest one (so-called maximum Feret diameter) of the distances between two parallel lines drawn from all angles so as to be in contact with the contour of the magnetic powder. Subsequently, the measured maximum plate diameters DB of the 50 magnetic powders are simply averaged (arithmetically averaged) to obtain an average maximum plate diameter DBave. Then, the average maximum plate diameter DBave obtained in this manner is used as the average particle size of the magnetic powder. Next, an average aspect ratio (DBave/DAave) of the magnetic powder is obtained on the basis of the average maximum plate thickness DAave and the average maximum plate diameter DBave.

Next, using the average maximum plate thickness DAave and the average maximum plate diameter DBave, an average volume (particle volume) Vave of the magnetic powder is obtained from the following formula.

$$V_{ave} = \frac{3\sqrt{3}}{8} \times DA_{ave} \times DB_{ave} \times DB_{ave} \qquad \text{(Math. 1)}$$

The magnetic powder may contain a powder of nanoparticles (hereinafter, referred to as "cobalt ferrite particles") containing Co-containing spinel ferrite. The cobalt ferrite particles favorably have uniaxial anisotropy. The cobalt ferrite particles have, for example, a cubic shape or a substantially cubic shape. The Co-containing spinel ferrite may further contain at least one of Ni, Mn, Al, Cu, or Zn, in addition to Co.

The Co-containing spinel ferrite has, for example, the average composition represented by the following formula (1).

$$Co_xM_yFe_2O_z \qquad (1)$$

(However, in the formula (1), M represents, for example, at least one metal selected from the group consisting of Ni, Mn, Al, Cu, and Zn. x represents a value within the range of $0.4 \leq x \leq 1.0$. y is a value within the range of $0 \leq y \leq 0.3$. However, x and y satisfy the relationship of $(x+y) \leq 1.0$. z represents a value within the range of $3 \leq z \leq 4$. Some Fe may be substituted by other metal elements.)

In the case where the magnetic powder contains a powder of cobalt ferrite particles, the average particle size of the magnetic powder is favorably 25 nm or less, more favorably 23 nm or less. In the case where the magnetic powder contains a powder of cobalt ferrite particles, the average aspect ratio of the magnetic powder is determined by the method described above, and the average volume Vave of the magnetic powder is determined by the method shown below.

Note that in the case where the magnetic powder has a cubic shape as in cobalt ferrite particles, the average volume (particle volume) Vave of the magnetic powder can be obtained as follows. First, the surface of the magnetic layer 13 of the magnetic recording medium 1 is observed by TEM. Next, 50 magnetic powders are randomly selected from the obtained TEM photograph, and a side length DC of each of the magnetic powders is measured. Subsequently, the measured side lengths DC of the 50 magnetic powders are simply averaged (arithmetically averaged) to obtain an average side length DCave. Next, using the average side length DCave, the average volume (particle volume) Vave of the magnetic powder is obtained from the following formula.

$$V\text{ave} = DC\text{ave}^3$$

(Binder)

As the binder, a resin having a structure in which a crosslinking reaction is imparted to a polyurethane resin, a vinyl chloride resin, or the like is favorable. However, the binder is not limited thereto. Other resins may be appropriately blended depending on the physical properties and the like required for the magnetic recording medium 1. The resin to be blended is not particularly limited as long as it is a resin commonly used in the coating-type magnetic recording medium 1.

Examples of the resin include polyvinyl chloride, polyvinyl acetate, a vinyl chloride-vinyl acetate copolymer, a vinyl chloride-vinylidene chloride copolymer, a vinyl chloride-acrylonitrile copolymer, an acrylic ester-acrylonitrile copolymer, an acrylic ester-vinyl chloride-vinylidene chloride copolymer, a vinyl chloride-acrylonitrile copolymer, an acrylic ester-acrylonitrile copolymer, an acrylic ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, nitrocellulose), a styrene butadiene copolymer, a polyester resin, an amino resin, and synthetic rubber.

Further, examples of the thermosetting resin or the reactive resin include a phenol resin, an epoxy resin, a urea resin, a melamine resin, an alkyd resin, a silicone resin, a polyamine resin, and a urea formaldehyde resin.

Further, a polar functional group such as $-SO_3M$, $-OSO_3M$, $-COOM$, and $P=O(OM)_2$ may be introduced into the above-mentioned binders for the purpose of improving dispersibility of the magnetic powder. Here, M in the formula represents a hydrogen atom, or an alkali metal such as lithium, potassium, and sodium.

Further, examples of the polar functional groups include those of the side chain type having the terminal group of $-NR1R2$ or $-NR1R2R3^+X^-$ and those of the main chain type having $>NR1R2^+X^-$. Here, R1, R2, and R3 in the formula each represent a hydrogen atom or a hydrocarbon group, and X represents a halogen element ion such as fluorine, chlorine, bromine, and iodine, or an inorganic or organic ion. Further, examples of the polar functional groups include also $-OH$, $-SH$, $-CN$, and an epoxy group.

(Lubricant)

It is favorable that the lubricant contains a compound represented by the following general formula (1) and a compound represented by the following general formula (2). In the case where the lubricant contains these compounds, it is possible to particularly reduce the dynamic friction coefficient of the surface of the magnetic layer 13. Therefore, it is possible to further improve the traveling property of the magnetic recording medium 1.

$$CH_3(CH_2)_nCOOH \qquad (1)$$

(However, in the general formula (1), n represents an integer selected from the range of 14 or more and 22 or less.)

$$CH_3(CH_2)_pCOO(CH_2)_qCH_3 \qquad (2)$$

(However, in the general formula (2), p represents an integer selected from the range of 14 or more and 22 or less, and q represents an integer selected from the range of 2 or more and 5 or less.)

(Additive)

The magnetic layer 13 may further contain, as non-magnetic reinforcing particles, aluminum oxide (α, β, or γ alumina), chromium oxide, silicon oxide, diamond, garnet, emery, boron nitride, titanium carbide, silicon carbide, titanium carbide, titanium oxide (rutile-type or anatase-type titanium oxide), or the like.

[Non-Magnetic Layer 12]

The non-magnetic layer 12 contains a non-magnetic powder and a binder. The non-magnetic layer 12 may contain, as necessary, an additive such as conductive particles, a lubricant, a curing agent, and a rust inhibitor.

The thickness of the non-magnetic layer 12 is favorably 0.6 μm or more and 2.0 μm or less, more favorably 0.6 μm or more and 1.4 μm or less, more favorably 0.8 μm or more and 1.4 μm or less, and more favorably 0.6 μm or more and 1.0 μm or less. The thickness of the non-magnetic layer 12 can be obtained by a method similar to the method of obtaining the thickness of the magnetic layer 13 (e.g., TEM). Note that the magnification of the TEM image is appropriately adjusted in accordance with the thickness of the non-magnetic layer 12.

(Non-Magnetic Powder)

The non-magnetic powder includes, for example, at least one of an inorganic particle powder or an organic particle powder. Further, the non-magnetic powder may contain a carbon material such as carbon black. Note that one type of non-magnetic powder may be used alone, or two or more types of non-magnetic powders may be used in combination. The inorganic particles include, for example, a metal, a metal oxide, a metal carbonate, a metal sulfate, a metal nitride, a metal carbide, or a metal sulfide. Examples of the shape of the non-magnetic powder include, but not limited to, various shapes such as a needle shape, a spherical shape, a cubic shape, and a plate shape.

(Binder)

The binder is similar to that in the magnetic layer 13 described above.

[Back Layer 14]

The back layer 14 contains a non-magnetic powder and a binder. The back layer 14 may contain, as necessary, an additive such as a lubricant, a curing agent, and an antistatic agent. As the non-magnetic powder and the binder, materials similar to those used in the above-mentioned non-magnetic layer 12 are used.

(Non-Magnetic Powder)

The average particle size of the non-magnetic powder is favorably 10 nm or more and 150 nm or less, more favorably 15 nm or more and 110 nm or less. The average particle size of the magnetic powder is obtained in a way similar to that for the average particle size D of the above-mentioned magnetic powder. The non-magnetic powder may include a non-magnetic powder having two or more particle size distributions.

The upper limit value of the average thickness of the back layer 14 is favorably 0.6 μm or less, more favorably 0.5 μm or less, and still more favorably 0.4 μm or less. When the upper limit value of the average thickness of the back layer 14 is 0.6 μm or less, since the thickness of the non-magnetic layer 12 and the base material 11 can be kept thick even in the case where the average thickness of the magnetic recording medium 1 is 5.6 μm, it is possible to maintain the traveling stability of the magnetic recording medium 1 in a recording/reproduction device. The lower limit value of the average thickness of the back layer 14 is not particularly limited, but is, for example, 0.2 μm or more.

The average thickness of the back layer 14 is obtained as follows. First, the magnetic recording medium 1 having a ½ inch width is prepared and cut into a length of 250 mm to prepare a sample. Next, using a laser hologage manufactured by Mitutoyo as a measurement device, the thickness of the sample is measured at five or more points, and the measured values are simply averaged (arithmetically averaged) to calculate an average value $t_T$ [μm] of the magnetic recording medium 1. Note that the measurement positions are randomly selected from the sample. Subsequently, the back layer 14 of the sample is removed with a solvent such as MEK (methyl ethyl ketone) and dilute hydrochloric acid. After that, the thickness of the sample is measured at five or more points using the above-mentioned laser hologage, and the measured values are simply averaged (arithmetically averaged) to calculate an average value $t_B$ [μm] of the magnetic recording medium 1 from which the back layer 14 has been removed. Note that the measurement positions are randomly selected from the sample. After that, an average thickness $t_b$ [μm] of the back layer 14 is obtained from the following formula.

$$t_b[\mu m]=t_T[\mu m]-t_B[\mu m]$$

The back layer 14 has a surface in which a large number of protrusions are provided. The large number of protrusions are for forming a large number of holes in the surface of the magnetic layer 13 in the state where the magnetic recording medium 1 is wound in a roll shape. The large number of holes include, for example, a large number of non-magnetic particles protruding from the surface of the back layer 14.

In this description, the case where a large number of protrusions provided in the surface of the back layer 14 are transferred to the surface of the magnetic layer 13 to form a large number of holes in the surface of the magnetic layer 13 has been described. However, the method of forming a large number of holes is not limited thereto. For example, a large number of holes may be formed in the surface of the magnetic layer 13 by adjusting the type of solvent contained in the coating material for forming a magnetic layer and the drying condition of the coating material for forming a magnetic layer.

[Average Thickness of Magnetic Recording Medium]

The upper limit value of the average thickness (average total thickness) of the magnetic recording medium 1 is favorably 5.6 μm or less, more favorably 5.4 μm or less, more favorably 5.2 μm or less, more favorably 5.0 μm or less, more favorably 4.8 μm or less, more favorably 4.6 m or less, and still more favorably 4.4 μm or less. When the average thickness of the magnetic recording medium 1 is 5.6 μm or less, the recording capacity in the cartridge 21 can be made higher than a typical magnetic recording medium. The lower limit value of the average thickness of the magnetic recording medium 1 is not particularly limited, but is, for example, 3.5 m or more.

The average thickness of the magnetic recording medium 1 is obtained by the procedure described in the above-mentioned method of obtaining the average thickness of the back layer 14.

(Coercive Force Hc)

The upper limit value of the coercive force He in the longitudinal direction of the magnetic recording medium 1 is, for example, 2,500 or less, favorably 2,000 Oe or less, more favorably 1,900 Oe or less, and still more favorably 1,800 Oe or less.

In the case where the lower limit value of the coercive force He measured in the longitudinal direction of the magnetic recording medium 1 is favorably 1,000 Oe or more, demagnetization due to leakage flux from the recording head can be suppressed.

The above-mentioned coercive force He is obtained as follows. First, three magnetic recording mediums 1 are stacked on top of each other with double-sided tapes, and then punched out by a φ6.39 mm punch to create a measurement sample. Then, the M-H loop of the measurement sample (the entire magnetic recording medium 1) corresponding to the longitudinal direction of the magnetic recording medium 1 (the traveling direction of the magnetic recording medium 1) is measured using a vibrating sample magnetometer (VSM). Next, acetone, ethanol, or the like is used to wipe off the coating film (the non-magnetic layer 12, the magnetic layer 13, the back layer 14, and the like), leaving only the base material 11. Then, the obtained three base materials 11 are stacked on top of each other with double-sided tapes, and then punched out by a (6.39 mm punch to obtain a sample for background correction (hereinafter, referred to simply as a sample for correction). Then, the VSM is used to measure the M-H loop of the sample for correction (the base material 11) corresponding to the longitudinal direction of the base material 11 (the traveling direction of the magnetic recording medium 1).

In the measurement of the M-H loop of the measurement sample (entire magnetic recording medium 1) and the M-H loop of the sample for correction (the base material 11), a high sensitivity vibrating sample magnetometer "VSM-P7-15 type" manufactured by TOEI INDUSTRIAL CO., LTD. is used. The measurement conditions are as follows. Measurement mode: full loop, maximum magnetic field: 15 kOe, magnetic field step: 40 bit, Time constant of Locking amp: 0.3 sec, Waiting time: 1 sec, MH averaging number: 20.

After two M-H loops are obtained, the M-H loop of the sample for correction (the base material 11) is subtracted from the M-H loop of the measurement sample (entire magnetic recording medium 1) to perform background correction, and the M-H loop after the background correction is obtained. The measurement/analysis program attached to the "VSM-P7-15 type" is used to calculate the background correction.

The coercive force Hc is obtained from the obtained M-H loop after the background correction. Note that for this calculation, the measurement/analysis program attached to the "VSM-P7-15 type" is used. Note that the above-mentioned measurement of the M-H loop is performed at 25° C. Further, "demagnetizing field correction" when measuring the M-H loop in the longitudinal direction of the magnetic recording medium 1 is not performed.

(Degree of Orientation (Squareness Ratio))

The degree of perpendicular orientation is obtained as follows. First, three magnetic recording mediums 1 are stacked on top of each other with double-sided tapes, and then punched out by a φ6.39 mm punch to create a measurement sample. Then, the VSM is used to measure the M-H loop of the measurement sample (the entire magnetic recording medium 1) corresponding to the perpendicular direction (the thickness direction) of the magnetic recording medium 1. Next, acetone, ethanol, or the like is used to wipe off the coating film (the non-magnetic layer 12, the magnetic layer 13, the back layer 14, and the like), leaving only the base material 11. Then, the obtained three base materials 11 are stacked on top of each other with double-sided tapes, and then punched out by a φ6.39 mm punch to obtain a sample for background correction (hereinafter, referred to simply as a sample for correction). Then, the VSM is used to measure the M-H loop of the sample for correction (the base material 11) corresponding to the perpendicular direction of the base material 11 (the perpendicular direction of the magnetic recording medium 1).

In the measurement of the M-H loop of the measurement sample (entire magnetic recording medium 1) and the M-H loop of the sample for correction (the base material 11), a high sensitivity vibrating sample magnetometer "VSM-P7-15 type" manufactured by TOEI INDUSTRIAL CO., LTD. is used. The measurement conditions are as follows. Measurement mode: full loop, maximum magnetic field: 15 kOe, magnetic field step: 40 bit, Time constant of Locking amp: 0.3 sec, Waiting time: 1 sec, MH averaging number: 20.

After two M-H loops are obtained, the M-H loop of the sample for correction (the base material 11) is subtracted from the M-H loop of the measurement sample (entire magnetic recording medium 1) to perform background correction, and the M-H loop after the background correction is obtained. The measurement/analysis program attached to the "VSM-P7-15 type" is used to calculate the background correction.

The saturation magnetization Ms (emu) and residual magnetization Mr (emu) of the obtained M-H loop after the background correction are substituted into the following formula to calculate the degree of perpendicular orientation (%). Note that the above-mentioned measurement of the M-H loop is performed at 25° C. Further, "demagnetizing field correction" when measuring the M-H loop in the perpendicular direction of the magnetic recording medium 1 is not performed. Note that for this calculation, the measurement/analysis program attached to the "VSM-P7-15 type" is used.

$$\text{Degree of perpendicular orientation (\%)} = (Mr/Ms) \times 100$$

The degree of orientation (degree of longitudinal orientation) in the longitudinal direction (traveling direction) of the magnetic recording medium 1 is favorably 35% or less, more favorably 30% or less, and still more favorably 25% or less. When the degree of longitudinal orientation is 35% or less, the perpendicular orientation of the magnetic powder becomes sufficiently high, so that a more excellent SNR can be obtained.

The degree of longitudinal orientation is determined in a manner similar to that for the degree of perpendicular orientation except that the M-H loop is measured in the longitudinal direction (traveling direction) of the magnetic recording medium 1 and the base material 11.

(Dynamic Friction Coefficient)

In the case where a ratio ($\mu_B/\mu_A$) of a dynamic friction coefficient $\mu_B$ between the surface of the magnetic layer 13 and the magnetic head when the tension applied to the magnetic recording medium 1 is 0.4 N to a dynamic frictional coefficients $\mu_A$ between the surface of the magnetic layer 13 and the magnetic head when the tension applied to the magnetic recording medium 1 is 1.2 N is favorably 1.0 or more and 2.0 or less, the change in friction coefficient due to the tension fluctuation during traveling can be reduced, and thus, it is possible to stabilize the traveling of the tape.

In the case where a ratio ($\mu_{1000}/\mu_5$) of a value $\mu_{1000}$ at the 1000-th traveling to a value $\mu_5$ at the fifth traveling of the dynamic friction coefficient $\mu_A$ between the surface of the magnetic layer 13 and the magnetic head when the tension applied to the magnetic recording medium 1 is 0.6 N is favorably 1.0 or more and 2.0 or less, more favorably 1.0 or more and 1.5 or less. In the case where the ratio ($\mu_B/\mu_A$) is 1.0 or more and 2.0 or less, the change in friction coefficient due to a large number of times of traveling can be reduced, and thus, the traveling of the tape can be stabilized.

<Method of Producing Magnetic Recording Medium>

Next, a method of producing the magnetic recording medium 1 will be described. First, a coating material for forming a non-magnetic layer is prepared by kneading and dispersing a non-magnetic powder, a binder, a lubricant, and the like in a solvent. Next, a coating material for forming a magnetic layer is prepared by kneading and dispersing a magnetic powder, a binder, a lubricant, and the like in a solvent. Next, a coating material for forming a back layer is prepared by kneading and dispersing a binder, a non-magnetic powder, and the like in a solvent. For preparing the coating material for forming a magnetic layer, the coating material for forming a non-magnetic layer, and the coating material for forming a back layer, for example, the following solvents, dispersing devices, and kneading devices can be used.

Examples of the solvent used for preparing the above-mentioned coating material include a ketone solvent such as acetone, methyl ethyl ketone, methyl isobutyl ketone, and cyclohexanone, an alcohol solvent such as methanol, ethanol, and propanol, an ester solvent such as methyl acetate, ethyl acetate, butyl acetate, propyl acetate, ethyl lactate, and ethylene glycol acetate, an ether solvent such as diethylene glycol dimethyl ether, 2-ethoxyethanol, tetrahydrofuran, and dioxane, an aromatic hydrocarbon solvent such as benzene, toluene, and xylene, and a halogenated hydrocarbon solvent such as methylene chloride, ethylene chloride, carbon tetrachloride, chloroform, and chlorobenzene. These may be used alone or may be appropriately mixed and used.

As the above-mentioned kneading apparatus used for the preparation of the coating materials, for example, a kneading apparatus such as a continuous twin-screw kneader, a continuous twin-screw kneader capable of diluting in multiple stages, a kneader, a pressure kneader, and a roll kneader can be used. However, the present technology is not particularly limited to these apparatuses. Further, as the above-mentioned dispersion apparatus used for the preparation of the coating materials, for example, a dispersion apparatus such as a roll mill, a ball mill, a horizontal sand mil, a perpendicular sand mil, a spike mill, a pin mill, a tower mill, a pearl mill (e.g., "DCP mill" manufactured by Eirich Co., Ltd.), a homogenizer, and an ultrasonic disperser can be used. However, the present technology is not particularly limited to these apparatuses.

Next, the non-magnetic layer 12 is formed by applying a coating material for forming a non-magnetic layer onto one main surface of the base material 11 and drying the coating material. Subsequently, a coating material for forming a magnetic layer is applied onto the non-magnetic layer 12 and dried to form the magnetic layer 13 on the non-magnetic layer 12. Note that it is favorable to orient, during drying, the magnetic field of the magnetic powder in the thickness direction of the base material 11 by means of, for example, a solenoid coil. Further, during drying, after orienting the magnetic field of the magnetic powder in the traveling direction (longitudinal direction) of the base material 11 by means of, for example, a solenoid coil, the magnetic field may be oriented in the thickness direction of the base material 11. After forming the magnetic layer 13, the back layer 14 is formed by applying a coating material for forming a back layer onto the other main surface of the base material 11 and drying the coating material. As a result, the magnetic recording medium 1 is obtained.

After that, calendaring treatment is performed on the obtained magnetic recording medium 1 to smooth the surface of the magnetic layer 13. Next, the magnetic recording medium 1 on which calendaring treatment has been performed is wound into rolls, and then, heat treatment is performed on the magnetic recording medium 1 in this condition to transfer a large number of protrusions 14A on the surface of back layer 14 to the surface of the magnetic layer 13. As a result, a large number of holes 13A are formed on the surface of the magnetic layer 13.

The temperature of the heat treatment is favorably 55° C. or higher and 75° C. or less. In the case where the temperature of the heat treatment is 55° C. or higher, favorable transferability can be achieved. Meanwhile, in the case where the temperature of the heat treatment is 75° C. or more, the amount of pores becomes too large, and the lubricant on the surface becomes excessive. Here, the temperature of the heat treatment is the temperature of the atmosphere in which the magnetic recording medium 1 is held.

The time of the heat treatment is favorably 15 hours or more and 40 hours or less. In the case where the time of the heat treatment is 15 hours or more, favorable transferability can be obtained. Meanwhile, in the case where the time of the heat treatment is 40 hours or less, a decrease in productivity can be suppressed.

Finally, the magnetic recording medium 1 is cut into a predetermined width, (e.g., ½ inch width). In this way, the target magnetic recording medium 1 is obtained.

[Process of Preparing Coating Material for Forming a Magnetic Layer]

Next, the process of preparing a coating material for forming a magnetic layer will be described. First, a first composition of the following formulation was kneaded with an extruder. Next, the kneaded first composition and a second composition of the following formulation were added to a stirring tank including a dispersion device to perform preliminary mixing. Subsequently, sand mill mixing was further performed, and filter treatment was performed to prepare a coating material for forming a magnetic layer.

(First Composition)
Powder of barium ferrite ($BaFe_{12}O_{19}$) particles (hexagonal plate-shaped, aspect ratio 2.8, particle volume 1,950 $nm^3$): 100 parts by mass
Vinyl chloride resin (cyclohexanone solution 30 mass %): 51.3 parts by mass (solution included)
(the degree of polymerization 300, Mn=10,000, containing $OSO_3K$=0.07 mmol/g and secondary OH=0.3 mmol/g as polar groups.)
Aluminum oxide powder: 5 parts by mass
($\alpha$-$Al_2O_3$, average particle size 0.2 μm)
Carbon black: 2 parts by mass
(Manufactured by Tokai Carbon Co., Ltd., trade name: Seast TA)
(Second Composition)
Vinyl chloride resin: 1.1 parts by mass
(Resin solution: resin content 30% by mass, cyclohexanone 70% by mass)
N-butyl stearate: 2 parts by mass
Methylethylketone: 121.3 parts by mass
Toluene: 121.3 parts by mass
Cyclohexanone: 60.7 parts by mass Finally, four parts by mass of polyisocyanate (trade name: Coronate L, manufactured by Nippon Polyurethane Co., Ltd.) and two parts by mass of myristic acid were added, as curing agents, to the coating material for forming a magnetic layer prepared as described above.

[Process of Preparing Coating Material for Forming Non-Magnetic Layer]

Next, the process of preparing a coating material for forming a non-magnetic layer will be described. First, a third composition of the following formulation was kneaded with an extruder. Next, the kneaded third composition and a fourth composition of the following formulation were added to a stirring tank including a dispersion device to perform preliminary mixing. Subsequently, sand mill mixing was further performed, and filter treatment was performed to prepare a coating material for forming a non-magnetic layer.

(Third Composition)

Acicular iron oxide powder: 100 parts by mass ($\alpha$-$Fe_2O_3$, average major axis length 0.15 μm)

Vinyl chloride resin: 55.6 parts by mass
(Resin solution: resin content 30% by mass, cyclohexanone 70% by mass)

Carbon black: 10 parts by mass
(Average particle size 20 nm)

(Fourth Composition)

Polyurethane resin UR8200 (manufactured by Toyobo CO., LTD.): 18.5 parts by mass N-butyl stearate: 2 parts by mass Methylethylketone: 108.2 parts by mass Toluene: 108.2 parts by mass Cyclohexanone: 18.5 parts by mass Finally, four parts by mass of polyisocyanate (trade name: Coronate L, manufactured by Nippon Polyurethane Co., Ltd.) and two parts by mass of myristic acid were added, as curing agents, to the coating material for forming a non-magnetic layer prepared as described above.

[Process of Preparing Coating Material for Forming Back Layer]

Next, the process of preparing the coating material for forming a back layer will be described. A coating material for forming a back layer was prepared by mixing the following raw materials in a stirring tank including a dispersion device and performing filter treatment thereon.

Powder of carbon black particles (average particle size 20 nm): 90 parts by mass Powder of carbon black particles (average particle size 270 nm): 10 parts by mass Polyester polyurethane: 100 parts by mass
(manufactured by Nippon Polyurethane Co., Ltd., product name: N-2304)

Methyl ethyl ketone: 500 parts by mass

Toluene: 400 parts by mass

Cyclohexanone: 100 parts by mass

Note that the type and the blending amount of the inorganic particles may be changed as follows.

Powder of carbon black particles (average particle size 20 nm): 80 parts by mass Powder of carbon black particles (average particle size 270 nm): 20 parts by mass Further, the type and the blending amount of the inorganic particles may be changed as follows.

Powder of carbon black particles (average particle size 20 nm): 100 parts by mass

[Application Process]

The coating material for forming a magnetic layer and coating material for forming a non-magnetic layer prepared as described above were used to form a non-magnetic layer with an average thickness of 1.0 to 1.1 μm and a magnetic layer with an average thickness of 40 to 100 nm on one main surface of an elongated polyethylene naphthalate film (hereinafter, referred to as "PEN film") that is a non-magnetic support (e.g., average thickness 4.0 μm) as follows. First, the coating material for forming a non-magnetic layer was applied onto one main surface of the PEN film and dried to form a non-magnetic layer. Next, the coating material for forming a magnetic layer was applied onto the non-magnetic layer and dried to form a magnetic layer. Note that when the coating material for forming a magnetic layer was dried, magnetic field of the magnetic powder was oriented in the thickness direction of the film by means of a solenoidal coil. Note that the degree of orientation in the thickness direction (perpendicular direction) and the degree of orientation in the longitudinal direction of the magnetic recording medium were set to predetermined values by adjusting the magnitude of the magnetic field from the solenoid coil (2 to 3 times the holding force of the magnetic powder), adjusting the solid content of the coating material for forming a magnetic layer, or adjusting the conditions for the magnetic powder to orient in a magnetic field by the adjustment of the drying conditions (drying temperature and drying time) of the coating material for forming a magnetic layer. Subsequently, a non-magnetic layer was formed by applying the coating material for forming a back layer onto the other main surface of the PEN film and drying the coating material. In this way, a magnetic recording medium was obtained. Note that in order to increase the degree of orientation, the dispersed condition of the coating material for forming a magnetic layer needs to be improved. In addition, in order to increase the degree of perpendicular orientation, it is also useful to magnetize the magnetic powder in advance before the magnetic recording medium enters the orientation device.

[Calendar Process, Transfer Process]

Subsequently, calendar treatment was performed to smooth the surface of the magnetic layer. Next, after winding the obtained magnetic recording medium in a roll, heat treatment of 60° C. for 10 hours was performed twice on the magnetic recording medium in this condition. As a result, a large number of protrusions on the surface of the back layer were transferred to the surface of the magnetic layer, and a large number of holes were formed on the surface of the magnetic layer.

[Cutting Process]

The magnetic recording medium obtained as described above was cut into a ½ inch (12.65 mm) width. As a result, a target elongated magnetic recording medium was obtained.

<Details of Cartridge>

Next, details of the cartridge 21 will be described.

[Configuration Example 1 of Cartridge]

Figure 20:
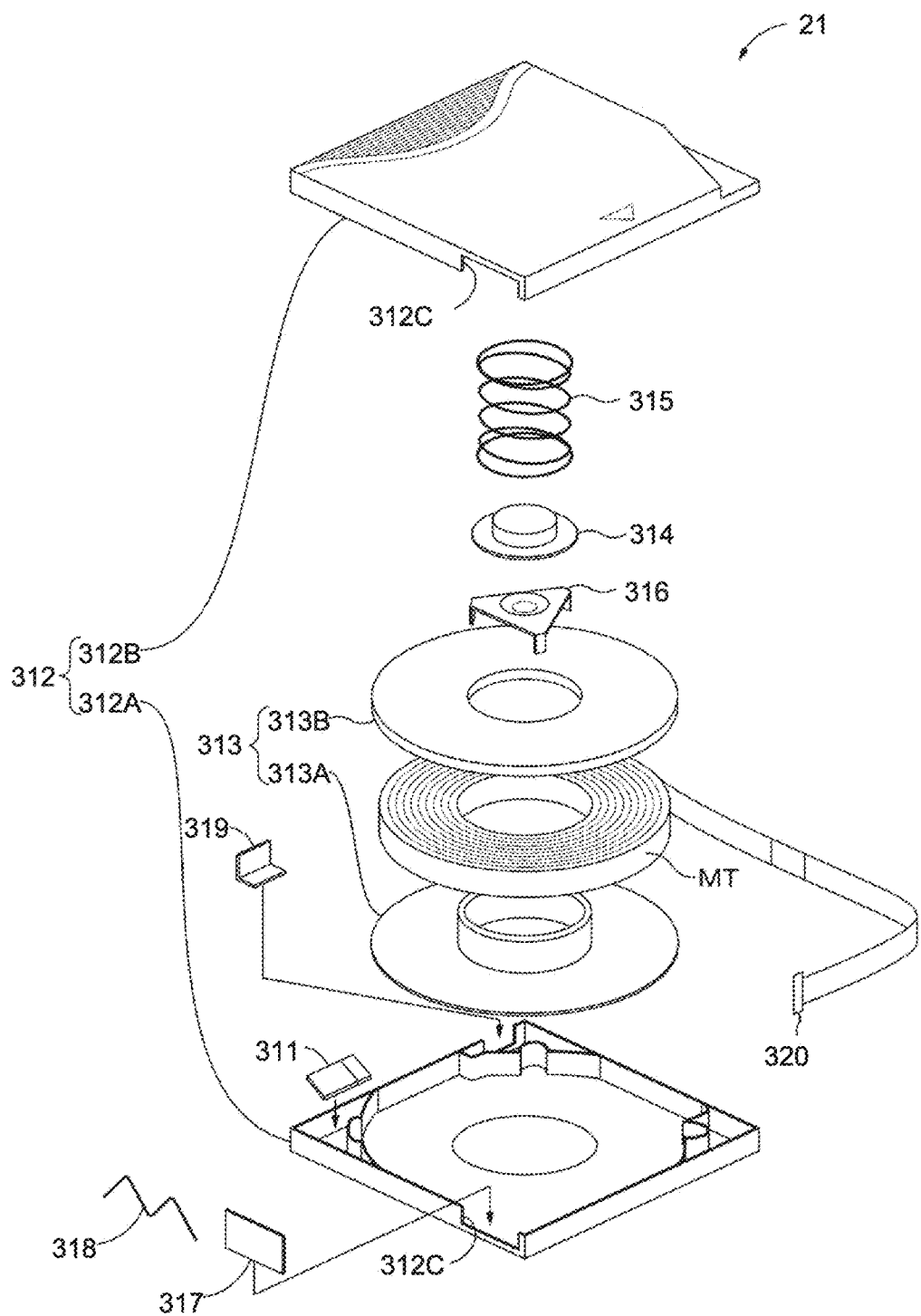
FIG. 20 is an exploded perspective view showing a configuration example of a cartridge.

FIG. 20 is an exploded perspective view showing an example of a configuration of the cartridge 21. The cartridge 21 includes, inside a cartridge case 312 including a lower shell 312A and an upper shell 312B, a reel 313 on which a tape-shaped magnetic recording medium (hereinafter, referred to as "magnetic tape") MT is wound, a reel lock 314 and a reel spring 315 for locking rotation of the reel 313, a spider 316 for releasing the locked state of the reel 313, a slide door 317 for opening and closing a tape outlet 312C provided on the cartridge case 312 across the lower shell 312A and the upper shell 312B, a door spring 318 for urging the slide door 317 to the closed position of the tape outlet 312C, a write protect 319 for preventing erroneous erasure, and a cartridge memory 311. The reel 313 has a substantially disk shape having an opening at the center thereof, and includes a reel hub 313A and a flange 313B formed of hard materials such as plastics. A leader pin 320 is provided at one end of the magnetic tape MT. The magnetic tape MT corresponds to the magnetic recording medium 1 according to this embodiment described above.

The cartridge 21 may be a magnetic tape cartridge conforming to the LTO (Linear Tape-Open) standard, or may be a magnetic tape cartridge conforming to a standard different from the LTO standard.

The cartridge memory 311 is provided in the vicinity of one corner of the cartridge 21. With the cartridge 21 loaded into the data recording device 20 (FIG. 5), the cartridge memory 311 faces the reader/writer of the data recording device 20. The cartridge memory 311 communicates with the data recording device 20, specifically with the reader/writer thereof by using a wireless communication standard conforming to the LTO standard.

Figure 21:
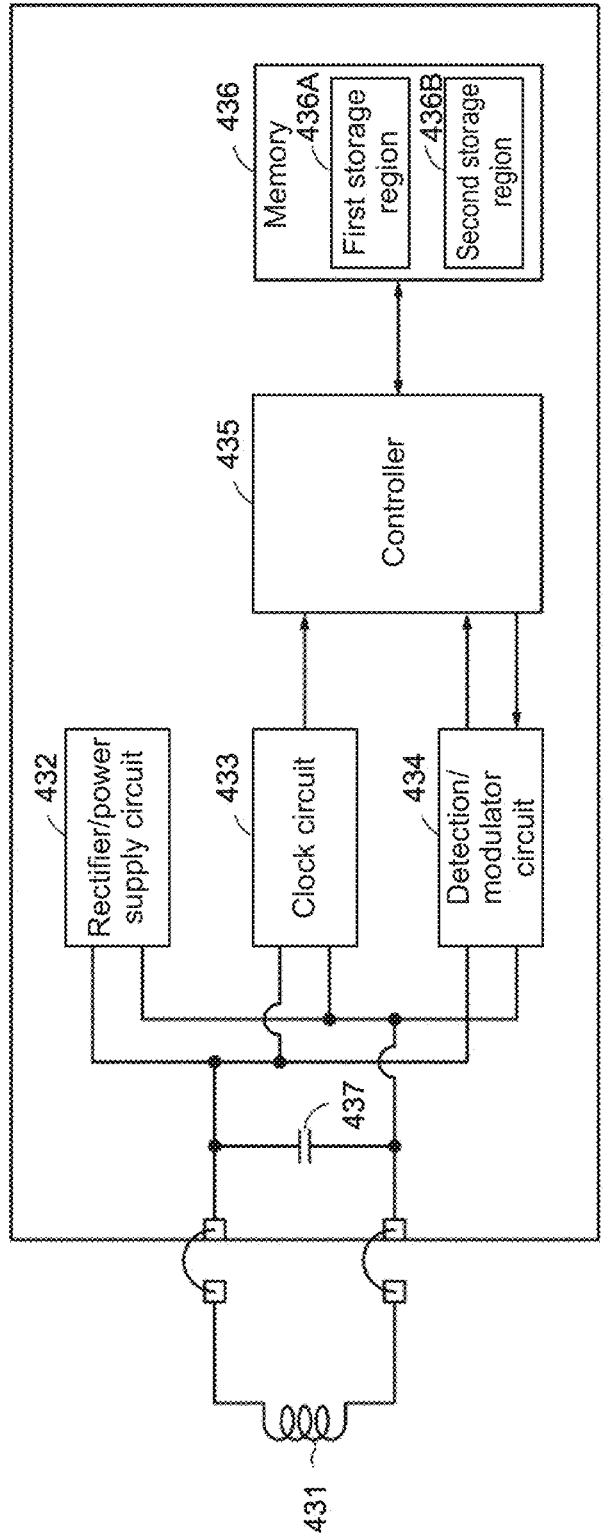
FIG. 21 is a block diagram showing a configuration example of a cartridge memory.

FIG. 21 is a block diagram showing an example of a configuration of the cartridge memory 311. The cartridge memory 311 includes an antenna coil (communication unit) 431 that communicates with a reader/writer using a specified communication standard, a rectifier/power supply circuit 432 for generating power from radio waves received by the antenna coil 431 using an induced electromotive force and rectifying the generated power to generate a power source, a clock circuit 433 that generates a clock using the induced electromotive force similarly from the radio waves received by the antenna coil 431, a detection/modulator circuit 434 for detecting radio waves received by the antenna coil 431 and modulating signals transmitted by the antenna coil 431, a controller (control unit) 435 that includes a logic circuit and the like for discriminating and processing a command and data from a digital signal extracted from the detection/modulator circuit 434, and a memory (storage unit) 436 that stores information. Further, the cartridge memory 311 includes a capacitor 437 connected in parallel to the antenna coil 431, and the antenna coil 431 and the capacitor 437 constitute a resonant circuit.

The memory 436 stores information and the like relating to the cartridge 21. The memory 436 is a non-volatile memory (NVM). The storage capacity of the memory 436 is favorably approximately 32 KB or more.

The memory 436 has a first storage region 436A and a second storage region 436B. The first storage region 436A corresponds to, for example, the storage region of a cartridge memory of the LTO standard before LTO8 (hereinafter, referred to as "existing cartridge memory"), and is a region for storing information conforming to the LTO standard before LTO8. Examples of information conforming to the LTO standard before LTO8 include manufacturing information (e.g., a unique number of the cartridge 21) and usage history (e.g., the number of times of tape drawing (Thread Count)).

The second storage region 436B corresponds to an extended storage region for the storage region of the existing cartridge memory. The second storage region 436B is a region for storing additional information. Here, the additional information means, for example, information relating to the cartridge 21, which is not specified in the LTO standard before LTO8. Examples of the additional information include, but not limited to, tension adjustment information, management ledger data, Index information, and thumbnail information of a moving image stored in the magnetic tape MT. The tension adjustment information is information for adjusting the tension applied to the magnetic tape MT in the longitudinal direction. The tension-adjustment information includes a distance between adjacent servo bands (a distance between servo patterns recorded on adjacent servo bands) at the time of recording data on the magnetic tape MT. The distance between the adjacent servo bands is an example of width-related information relating to the width of the magnetic tape MT. In the following description, information stored in the first storage region 436A is referred to as "first information" and information stored in the second storage region 436B is referred to as "second information" in some cases.

The memory 436 may include a plurality of banks. In this case, a part of the plurality of banks may constitute the first storage region 436A, and the remaining banks may constitute the second storage region 436B.

The antenna coil 431 induces an induced voltage by electromagnetic induction. The controller 435 communicates with the data recording device 20 in accordance with a specified communication standard via the antenna coil 431. Specifically, for example, mutual authentication, transmitting and receiving commands, exchanging data, and the like are performed.

The controller 435 stores information received from the data recording device 20 via the antenna coil 431 in the memory 436. For example, the tension adjustment information received from the data recording device 20 via the antenna coil 431 is stored in the second storage region 436B of the memory 436. The controller 435 reads information from the memory 436 and transmits the read information to the data recording device 20 via the antenna coil 431 in response to a request from the data recording device 20. For example, the tension adjustment information is read from the second storage region 436B of the memory 436 in response to a request from the data recording device 20, and transmitted to the data recording device 20 via the antenna coil 431.

[Configuration Example 2 of Cartridge]

Figure 22:
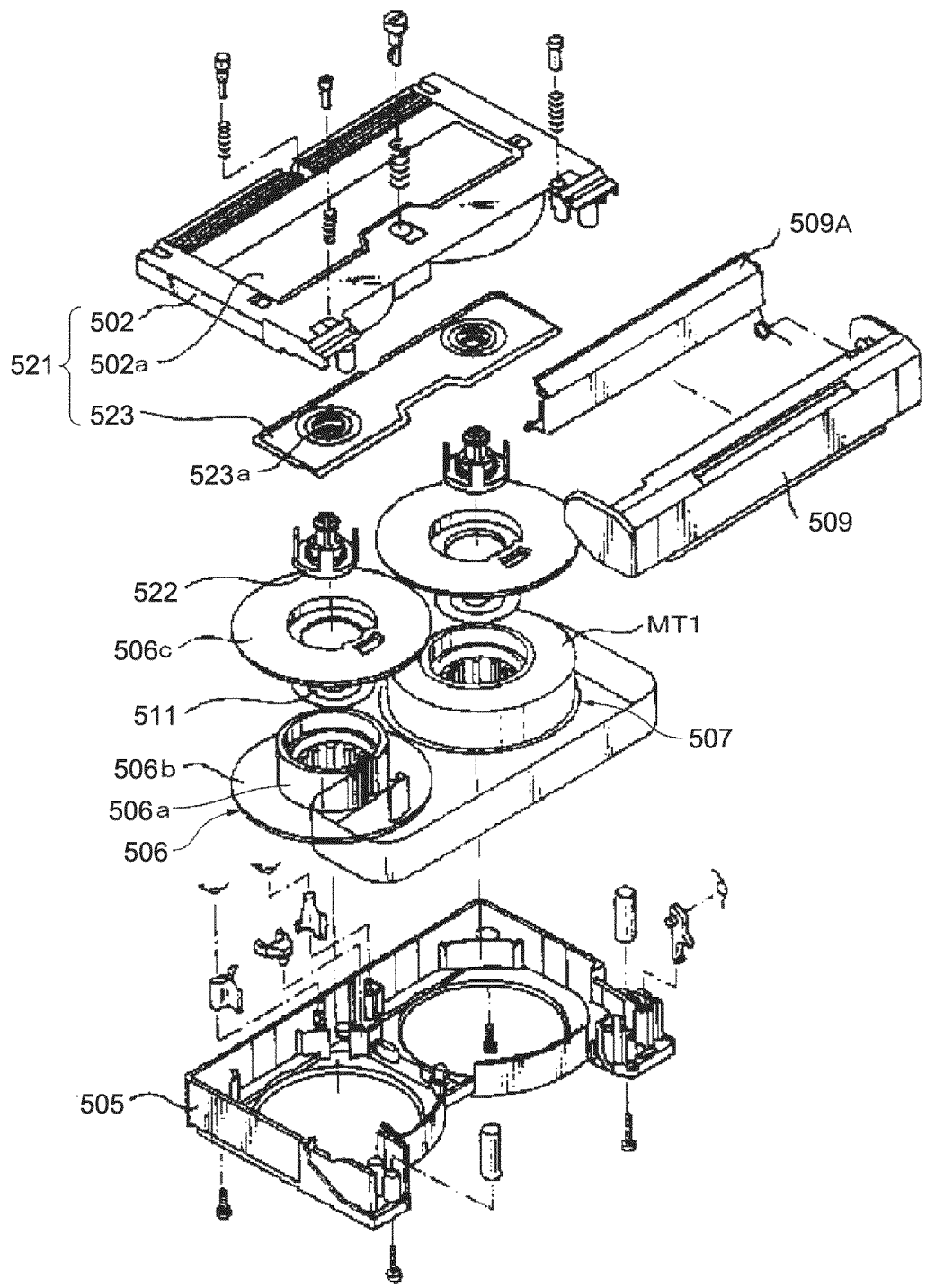
FIG. 22 is an exploded perspective view showing another configuration example of the cartridge.

FIG. 22 is an exploded perspective view showing an example of a configuration of a cartridge 521 of the two-reel type. The cartridge 521 includes an upper half 502 formed of synthetic resin, a transparent window member 523 fitted and fixed to a window portion 502a opened in the upper surface of the upper half 502, a reel holder 522 that is fixed to the inside of the upper half 502 to prevent reels 506 and 507 from floating, a lower half 505 corresponding to the upper half 502, the reels 506 and 507 housed in a space formed by combining the upper half 502 and the lower half 505, a magnetic tape MT1 wound on the reels 506 and 507, a front lid 509 that closes the front-side opening formed by combining the upper half 502 and the lower half 505, and a back lid 509A that protects the magnetic tape MT1 exposed to the front-side opening.

The reel 506 includes a lower flange 506b including a cylindrical hub portion 506a on which the magnetic tape MT1 is wound at the center, an upper flange 506c having substantially the same size as that of the lower flange 506b, and a reel plate 511 sandwiched between the hub portion 506a and the upper flange 506c. The reel 507 has a configuration similar to that of the reel 506.

Mounting holes 523a for assembling the reel holder 522 that is a reel holding means for preventing the reels 506 and 507 from floating are provided at positions corresponding to the reels 506 and 507 of the window member 523. The magnetic tape MT1 is configured similarly to the magnetic recording medium 1 in this embodiment described above.

It should be noted that the present technology may take the following configurations.

(1) A tape-shaped magnetic recording medium, including:
  a magnetic layer including a servo band, a servo signal being recorded on the servo band, in which
    an index expressed by Sq×Fact.(p–p)/F0(p–p) is 0.42 or more, Sq being a squareness ratio of the magnetic layer in a perpendicular direction, F0(p–p) being a peak-to-peak value of a first magnetic force gradient strength observed by a magnetic force microscope when a servo signal is saturation-recorded on the magnetic layer, Fact.(p–p) being a peak-to-peak value of a second magnetic force gradient strength for the servo signal recorded on the servo band observed by the magnetic force microscope.

(2) The magnetic recording medium according to (1) above, in which
the index is 0.45 or more.
(3) The magnetic recording medium according to (1) above, in which
the squareness ratio (Sq) of the magnetic layer in the perpendicular direction is 0.5 or more.
(4) The magnetic recording medium according to (3) above, in which
the squareness ratio (Sq) of the magnetic layer in the perpendicular direction is 0.6 or more.
(5) The magnetic recording medium according to (1) above, in which
a ratio (Fact.(p–p)/F0(p–p)) of Fact.(p–p) to F0(p–p) is 0.6 or more.
(6) The magnetic recording medium according to (5) above, in which
the ratio (Fact.(p–p)/F0(p–p)) of Fact.(p–p) to F0(p–p) is 0.7 or more.
(7) The magnetic recording medium according to (1) above, in which
a residual magnetization (Mrt) of the magnetic layer is 0.39 or more.
(8) The magnetic recording medium according to (7) above, in which
the residual magnetization (Mrt) of the magnetic layer is 0.45 or more.
(9) The magnetic recording medium according to any one of (1) to (8) above, in which
the servo signal is a servo signal recording pattern including a plurality of stripes inclined at a predetermined azimuth angle with respect to a tape width direction.
(10) The magnetic recording medium according to any one of (1) to (9), in which
the magnetic layer contains a magnetic powder of hexagonal ferrite, ε-iron oxide, or cobalt ferrite.
(11) The magnetic recording medium according to any one of (1) to (10) above, further including
a non-magnetic layer provided between a base material that supports the magnetic layer, one main surface of the base material, and the magnetic layer.
(12) The magnetic recording medium according to any one of (1) to (11) above, further including
a back layer provided on the other main surface of the base material.
(13) The magnetic recording medium according to any one of (1) to (12) above, in which
an average thickness of the magnetic recording medium is 5.6 μm or less.
(14) The magnetic recording medium according to any one of (1) to (13) above, in which
an average thickness of the magnetic recording medium is 5.4 μm or less.
(15) The magnetic recording medium according to any one of (1) to (14) above, in which
an average thickness of the magnetic recording medium is 5.2 μm or less.
(16) The magnetic recording medium according to any one of (1) to (15) above, in which
an average thickness of the magnetic recording medium is 5.0 μm or less.
(17) The magnetic recording medium according to any one of (1) to (16) above, in which
an average thickness of the non-magnetic layer is 0.6 μm or more and 2.0 μm or less.
(18)
(19) A cartridge, including:
a tape-shaped magnetic recording medium including a magnetic layer including a servo band, a servo signal being recorded on the servo band, in which
an index expressed by Sq×Fact.(p–p)/F0(p–p) is 0.42 or more, Sq being a squareness ratio of the magnetic layer in a perpendicular direction, F0(p–p) being a peak-to-peak value of a first magnetic force gradient strength observed by a magnetic force microscope when a servo signal is saturation-recorded on the magnetic layer, Fact.(p–p) being a peak-to-peak value of a second magnetic force gradient strength for the servo signal recorded on the servo band observed by the magnetic force microscope.

REFERENCE SIGNS LIST 1 magnetic recording medium
5 recording track
6 servo signal recording pattern
7 stripe
11 base material
12 non-magnetic layer
13 magnetic layer
14 back layer
200 servo signal recording device
210 servo write head
220 auxiliary magnetic pole
d data band
s servo band

The invention claimed is:
1. A tape-shaped magnetic recording medium, comprising:
a magnetic layer including a servo band, a servo signal being recorded on the servo band, wherein
an index expressed by Sq×Fact.(p–p)/F0(p–p) is 0.42 or more, Sq being a squareness ratio of the magnetic layer in a perpendicular direction, F0(p–p) being a peak-to-peak value of a first magnetic force gradient strength observed by a magnetic force microscope when a servo signal is saturation-recorded on the magnetic layer, Fact.(p–p) being a peak-to-peak value of a second magnetic force gradient strength for the servo signal recorded on the servo band observed by the magnetic force microscope.
2. The magnetic recording medium according to claim 1, wherein
the index is 0.45 or more.
3. The magnetic recording medium according to claim 1, wherein
the squareness ratio (Sq) of the magnetic layer in the perpendicular direction is 0.5 or more.
4. The magnetic recording medium according to claim 3, wherein
the squareness ratio (Sq) of the magnetic layer in the perpendicular direction is 0.6 or more.
5. The magnetic recording medium according to claim 1, wherein
a ratio (Fact.(p–p)/F0(p–p)) of Fact.(p–p) to F0(p–p) is 0.6 or more.
6. The magnetic recording medium according to claim 5, wherein
the ratio (Fact.(p–p)/F0(p–p)) of Fact.(p–p) to F0(p–p) is 0.7 or more.

7. The magnetic recording medium according to claim 1, wherein
   a residual magnetization (Mrt) of the magnetic layer is 0.39 or more.

8. The magnetic recording medium according to claim 7, wherein
   the residual magnetization (Mrt) of the magnetic layer is 0.45 or more.

9. The magnetic recording medium according to claim 1, wherein
   the servo signal is a servo signal recording pattern including a plurality of stripes inclined at a predetermined azimuth angle with respect to a tape width direction.

10. The magnetic recording medium according to claim 1, wherein
    the magnetic layer contains a magnetic powder of hexagonal ferrite, ε-iron oxide, or cobalt ferrite.

11. A servo signal recording device that records a servo signal on a tape-shaped magnetic recording medium including a magnetic layer including a servo band, the device including a servo write head and an auxiliary magnetic pole, comprising:
    a servo write head that records a servo signal on the servo band; and
    an auxiliary magnetic pole that is disposed to face the servo write head with the magnetic layer interposed therebetween, and is formed of a soft magnetic material.

* * * * *